(12) United States Patent
Buchanan et al.

(10) Patent No.: US 11,503,094 B2
(45) Date of Patent: Nov. 15, 2022

(54) SYSTEM AND METHOD FOR PERFORMING LOSSLESS SWITCHING IN A REDUNDANT MULTICAST NETWORK

(71) Applicant: GRASS VALLEY CANADA, Montreal (CA)

(72) Inventors: Lee Buchanan, Hillsboro, OR (US); Stephane Martel, Montreal (CA)

(73) Assignee: GRASS VALLEY CANADA, Montreal (CA)

( * ) Notice: Subject to any disclaimer, the term of this patent is extended or adjusted under 35 U.S.C. 154(b) by 0 days.

(21) Appl. No.: 17/032,448

(22) Filed: Sep. 25, 2020

(65) Prior Publication Data
US 2021/0014289 A1  Jan. 14, 2021

Related U.S. Application Data

(63) Continuation of application No. 15/695,827, filed on Sep. 5, 2017, now Pat. No. 10,791,158.

(Continued)

(51) Int. Cl.
*H04L 65/611* (2022.01)
*H04L 65/60* (2022.01)
(Continued)

(52) U.S. Cl.
CPC ............ *H04L 65/611* (2022.05); *H04L 12/18* (2013.01); *H04L 45/16* (2013.01); *H04L 45/22* (2013.01);
(Continued)

(58) Field of Classification Search
CPC ..... H04L 65/4076; H04L 12/18; H04L 45/16; H04L 45/22; H04L 45/3065; H04L 47/80;
(Continued)

(56) References Cited

U.S. PATENT DOCUMENTS 8,321,905 B1   11/2012  Streeter et al.
2008/0225850 A1  9/2008  Oran et al.
(Continued)

OTHER PUBLICATIONS

Matthias Laabs, "SDI Over IP—Seamless Signal Switching in SMPTE 2022-6 and a Novel Multicast Routing Concept," dated Nov. 28, 2012.

(Continued)

*Primary Examiner* — Nicholas R Taylor
*Assistant Examiner* — Chong G Kim
(74) *Attorney, Agent, or Firm* — ArentFox Schiff LLP

(57) ABSTRACT

A system and method is provided for performing lossless switching in a redundant multicast network. An exemplary method includes receiving a primary media stream and a redundant media stream over different forwarding network paths by network ports of a receiver communicatively coupled to an A/V device. Furthermore, the receiver outputs media data of the media streams to the A/V device to be presented thereon. In response to a control signal to switch the receiver to a new primary media stream, the method disconnected either the primary ort the redundant media streams from the respective network port of the receiver receiving that stream. Furthermore, the method includes controlling the disconnected network port to receive the new primary media stream and then outputting media data of the new primary media stream to the A/V device to be presented thereon.

19 Claims, 18 Drawing Sheets

Related U.S. Application Data

(60) Provisional application No. 62/385,063, filed on Sep. 8, 2016.

(51) Int. Cl.
| | | |
|---|---|---|
| *H04N 21/43* | (2011.01) | |
| *H04N 21/438* | (2011.01) | |
| *H04N 21/6405* | (2011.01) | |
| *H04L 47/80* | (2022.01) | |
| *H04L 12/18* | (2006.01) | |
| *H04L 45/16* | (2022.01) | |
| *H04L 45/302* | (2022.01) | |
| *H04L 45/00* | (2022.01) | |
| *H04L 65/40* | (2022.01) | |
| *H04L 69/22* | (2022.01) | |
| *H04L 67/148* | (2022.01) | |
| *H04L 65/65* | (2022.01) | |
| *H04L 67/563* | (2022.01) | |
| *H04L 65/80* | (2022.01) | |
| *H04L 69/14* | (2022.01) | |
| *H04L 65/75* | (2022.01) | |

(52) U.S. Cl.
CPC ......... *H04L 45/3065* (2013.01); *H04L 47/80* (2013.01); *H04L 65/40* (2013.01); *H04L 65/60* (2013.01); *H04L 65/65* (2022.05); *H04L 65/80* (2013.01); *H04L 67/148* (2013.01); *H04L 67/563* (2022.05); *H04L 69/14* (2013.01); *H04L 69/22* (2013.01); *H04N 21/43* (2013.01); *H04N 21/4384* (2013.01); *H04N 21/6405* (2013.01); *H04L 65/764* (2022.05)

(58) Field of Classification Search
CPC ....... H04L 65/40; H04L 65/60; H04L 65/608; H04L 65/80; H04L 67/148; H04L 67/2814; H04L 69/14; H04L 69/22; H04L 65/604; H04N 21/43; H04N 21/4384; H04N 21/6405
USPC ......................................................... 709/231
See application file for complete search history.

(56) References Cited

U.S. PATENT DOCUMENTS

2016/0373495 A1* 12/2016 Chen .................. H04L 65/80
2017/0070772 A1* 3/2017 Nakamura ......... H04N 21/4622
2018/0288424 A1* 10/2018 LaBosco ................ H04L 65/70

OTHER PUBLICATIONS

SMPTE Standard, "Seamless Protecting Switching of SMPTE ST 2022 IP Datagrams," dated Oct. 11, 2013.
A. Begen Cisco & C. Perkins, University of Glasgow, "Duplication RTP Streams," dated Feb. 20, 2014.
International Search Report & Written Opinion issued in PCT/EP2017/072387 dated Nov. 14, 2017.

\* cited by examiner

SYSTEM AND METHOD FOR PERFORMING LOSSLESS SWITCHING IN A REDUNDANT MULTICAST NETWORK

CROSS-REFERENCE TO RELATED APPLICATIONS

The current application is a divisional application of U.S. patent application Ser. No. 15/695,827, filed Sep. 5, 2017, which claims priority to U.S. Patent Provisional Application No. 62/385,063, filed Sep. 8, 2016, the entire contents of each of which are hereby incorporated by reference.

TECHNICAL FIELD

The system and method disclosed herein relates to multicast data transmission and reception, and, more particularly, to a system and method for performing lossless switching in a redundant multicast network.

BACKGROUND

Media channels, such as audio and video channels, have long been transmitted using application specific cables. More recently, media signals have been transmitted on computer based networks using protocols such as unicast or multicast. Unicast is a method of sending packets on a computer network to a single destination. Multicast is a protocol for efficiently sending data streams to multiple receivers at the same time on TCP/IP networks by use of a multicast address.

One technical issue with multicast data transmission is that when media signals are transmitted to a receiver, IP packets in the signal can often be lost due to various connection issues. In order to recover lost IP packets and reconstruct original streams, media networks can allow for redundant media packet streams to be transmitted and received. For example, a transmitter using the SMPTE 2022-7 communication standard duplicates the input stream and sends it via two different paths to the destination receiver. FIG. 1 illustrates a block diagram of a conventional system using redundancy (i.e., "seamless protection switching") to reconstruct a data stream with lost IP packets.

As shown, the system includes a transmitting device 10 and a receiving device 20 (both referred to as "edge" devices) that communicate by one or many IP data communication networks 30. Using the SMPTE 2022-7 standard, for example, the transmitter 10 continually processes the primary media packet input stream, duplicates the stream, and transmits it via the network 30 over two separate paths in the network (or two or more separate networks, for example). The receiver 20 combines the streams from both paths and reconstructs the original stream. Thus, path 1 can provide a primary data flow and path 2 can provide a redundant data flow. If a packet is lost in path 1, the receiver 20 is configured to take the packet from path 2. If path 1 is completely gone (i.e., a broken transmission path in the network), the receiver switches to path 2. Once the switch occurs, the receiver 20 ignores the primary media packet stream and processes the redundant copy from path 2.

Network redundancy is an effective way to efficiently transmit a data stream to a receiving device while minimizing potential loss of IP packets. However, there are certain drawbacks from network redundancy when a device that is receiving a multicast stream attempts to transition from the currently received multicast stream to a new multicast stream. For example, with the infrastructure shown in FIG. 1, the transmitting device 10 can send plural multicast streams using the networks 30 and receiving device 20 can join the multicast streams. The receiving device 20 will always be able to receive streams from transmitting devices as long as one of the network paths is functional. However, this type of network redundancy doubles the total bandwidth usage as all streams (primary and redundant) are transmitted over the networks.

Thus, if the receiving device 20 attempts to switch from a first multicast stream to a second multicast stream, the receiving device 20 can first join the new multicast stream and then leave the current multicast stream. However, this type of switching protocol has the drawback that there is a time when the current multicast stream and new multicast stream are both being received. While this time can be minimized, the time when both multicast streams are joined is always greater than zero. During the time when both multicast streams are joined, the total bandwidth consumption is the sum of both multicast streams. In cases where the current multicast stream and new multicast stream use the same amount of bandwidth the total bandwidth required is doubled when switching is performed using this method.

Alternatively, if the receiving device 20 leaves the current multicast stream and then joins the new multicast stream, there will be a discontinuity during the time when the current multicast stream has been dropped and the new multicast steam has been joined. While this time can be minimized, the time when no multicast stream is available is always greater than zero. The time when no multicast stream is available results in data loss which prevents lossless switching using this method.

Accordingly, a system and method is needed for lossless switching of multicast streams while efficiently minimizing bandwidth consumption.

SUMMARY

The proposed system and method provides lossless switching in redundant multicast networks by leveraging the inherent dual path and double bandwidth nature of redundant networks to enable lossless switching between multicast streams by joining new multicast streams while still joined to current multicast streams without doubling network bandwidth. This disclosed approach assumes the presence of a redundant, dual path network with edge devices that are connected to both network paths. As such, the transmitting device sends multicast streams to both networks with no changes to typical behavior. The receiving devices join the multicast streams from both networks and will continue to be able to receive streams from transmitting devices as long as one of the network paths is functional.

When both networks are available, the receiving devices perform lossless switching between multicast streams by joining a new multicast stream on one of the redundant network paths while maintaining the connection to the current multicast stream on the other redundant network path. This technique allows the edge device to simultaneously receive the current multicast stream and the new multicast stream without the need to double network bandwidth on either of the redundant network paths. The edge device can then seamlessly switch between the current and new multicast streams with zero data loss. Once the seamless switch is complete, the receiving edge device can then join the new multicast stream on the redundant network path to reestablish the redundancy. At no time during this method is there a need to double the total bandwidth usage.

Thus, according to an exemplary aspect, a media stream switching system is provided for performing lossless switching of media streams having redundancy without increased bandwidth consumption. In this aspect, the media stream switching system includes a receiver having at least first and second recorder channels each having a network port for respectively receiving at least one media stream; a media stream input controller configured to control the first and second recorder channels to respectively receive primary and redundant data streams of first media data over different forwarding paths of a multicast network; a media stream redundancy controller configured to store the primary data stream of the first media data in a first media stream buffer and replace lost data packets of the primary data stream with corresponding data packets from the redundant data stream; a media stream output configured to fetch the stored first media data from the first media stream buffer and output the fetched first media data to an A/V device communicatively coupled to the receiver for display thereon; a media stream disconnector configured to initiate a switch of the receiver from receiving the first media data to receiving second media data without increased bandwidth consumption by the receiver by disconnecting the second recorder channel from receiving the redundant data stream; a new media stream controller configured to control the disconnected recorder channel to receive a primary data stream of the second media data that is configured to be stored in a second media stream buffer; and a media stream switcher configured to perform lossless switching of the first media data to the second media data by switching the media stream output to switch from fetching the stored first media data to fetching the second media data stored in the second media stream buffer and output the fetched second media data to the A/V device to be displayed thereon, wherein the media stream disconnector is further configured to disconnect the first recorder channel from receiving the primary data stream of the first media data and the media stream input controller is further configured to control the disconnected first recorder channel to receive a redundant data stream of the second media data to provide redundancy for the second media data.

In another exemplary aspect, a media stream switcher is provided for performing lossless switching of media streams having redundancy. In this aspect, the media stream switcher includes a media stream redundancy controller configured to store a primary data stream of first media data in a media stream buffer and replace lost data packets of the primary data stream with corresponding data packets from a redundant data stream, wherein the primary and redundant data streams of the first media data are received by a pair of receiver channels over different forwarding paths of a multicast network; a media stream output configured to fetch the stored first media data from the media stream buffer to an A/V device communicatively coupled to the receiver for display thereon; a media stream switch controller configured disconnected one of the pair of receiver channels to initiate a switch from receiving the first media data to receiving second media data; a media stream alignment controller configured to control the disconnected receiver receive a primary data stream of the second media data and stored the received primary data stream of the second media data in the media stream buffer to be aligned with the primary data stream of the first media data; and a lossless switch controller configured to switch from the first media data to the second media data by controlling the media stream output to start fetching and outputting to the A/V device the stored second media data at a top of a frame of the first media data, such that first media data is cleanly switched to the second media data when displayed on the A/V device.

In yet another aspect, a media receiver is provided for performing lossless switching of media streams having redundancy. In this aspect, the media receiver includes at least two receiver channels configured to receive redundant data streams of first media data; a media player configured to playout the first media data on an A/V device; a media stream switcher configured to switch one of the at least two receiver channels from receiving the respective data stream of the first media data to receiving a data stream of second media data in order to initiate a switch from the first media data to the second media data without increasing a total amount of data streams received by the media receiver; a media stream alignment controller configured to align the respective received data streams of the first and second media streams; and a media data playout switcher configured to control the media player to perform a lossless switch without discontinuity on the A/V device from playing out the first media data to playing out the second media data.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 3A-3I illustrate block diagrams of a process of the receiving device performing lossless switching in a redundant multicast network in accordance with an exemplary embodiment.

DETAILED DESCRIPTION

Figure 1:
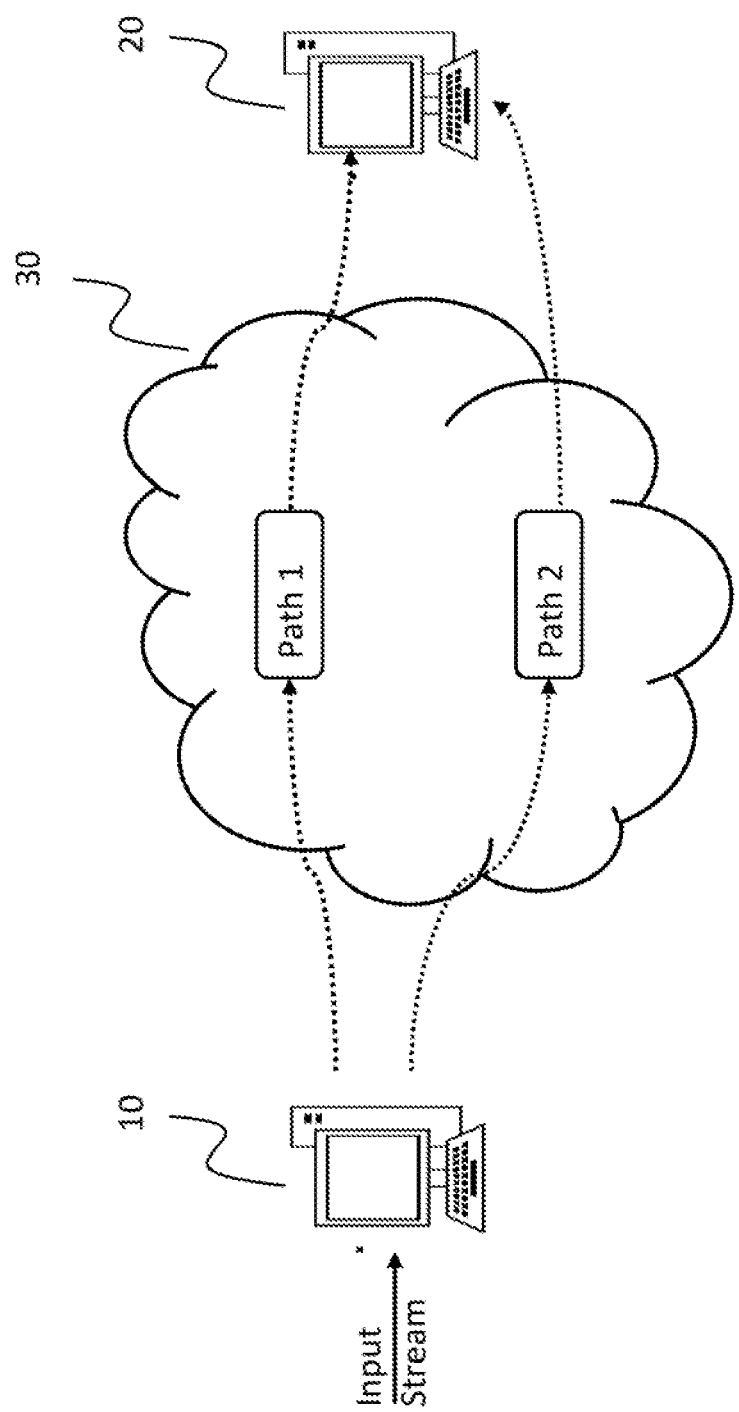
FIG. 1 illustrates a block diagram of a conventional system using redundancy (i.e., "seamless protection switching") to reconstruct a data stream with lost IP packets.

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

Figure 2:
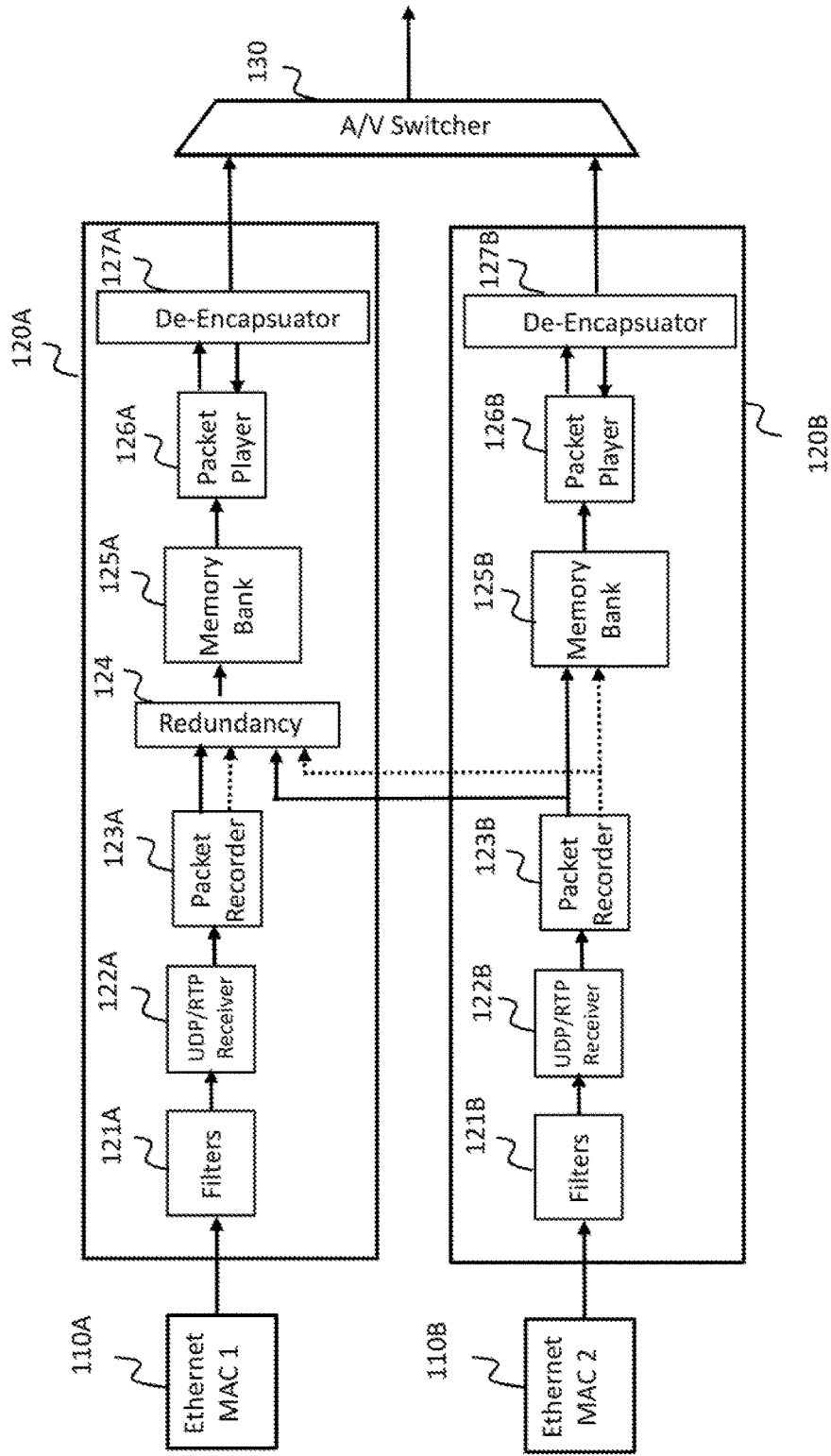
FIG. 2 illustrates a block diagram of a receiver configured to perform lossless switching in a redundant multicast network in accordance with an exemplary embodiment.

FIG. 2 illustrates a block diagram of a receiving device 100 configured to perform lossless switching in a redundant multicast network in accordance with an exemplary embodiment. As shown, the receiving device 100 includes a pair of receivers 120A and 120B, which can each include one or a plurality of recorder/receiver channels. Moreover, each receiver 120A and 120B is connected to an Ethernet MAC port 110A and 110B, respectively, that is configured to receive a multicast signal from a network as would be understood to one skilled in the art. It should be appreciated that while only two physical ports 110A and 110B are shown, the disclosed receiver 100 is in no way limited to only two ports and the concept is extensible to more than that, limited only by memory access speed.

In any event, as generally shown, receivers 120A and 120B can be configured to receive redundant data flows using the SMPTE 2202-7 protocol discussed above. As shown, receiver 120A includes one or a plurality of filters 121A, a UDP ("user datagram protocol"/RTP ("real-time transfer protocol") receiver 122A, and a packet recorder 123A. Similarly, receiver 120B includes one or a plurality of filters 121B, a UDP/RTP receiver 122B, and a packet recorder 123B. As further shown, packet recorders 123A and packet recorders 123B perform a redundancy function 124 to manage the primary multicast stream and the redundant multicast stream. In addition, while redundancy function 124 is shown to be part of receiver 120A, it will be appreciated based on the discussion below that this component is shared by both receivers 120A and 120B. For illustrative purposes, a first channel (i.e., a receiver or recorder channel) for the primary and redundant multicast streams is illustrated as solid arrows from packet recorders 123A and 123B to redundancy function 124. Moreover, a second channel (i.e., a receiver or recorder channel) for primary and redundant multicast streams is illustrated as dashed arrows from packet records 123A and 123B to redundancy function 124.

In addition, receiver 120A includes memory bank 125A, packet player 126A and de-encapsulator 127A. Likewise, receiver 120B includes memory bank 125B, packet player 126B and de-encapsulator 127B. The outputs of de-encapsulator 127A and de-encapsulator 127B are shown to be coupled to inputs of an audio/video switching device 130, which can simply be viewed to function as a multiplexor, for example. Each of the memory banks 125A and 125B, the packet players 126A and 126B and the de-encapsulators 127A and 127B are shown as separate components in FIG. 2 for illustrative purposes, but it is contemplated that such components can be shared between receivers 120A and 120B according to an exemplary embodiment. Moreover, while not shown in this figure, the receiving device 100 can include an external control circuit/processor that is configured to control which data flows (i.e., multicast media streams) are received by Ethernet MAC ports 110A and 110B, and also to control which signal (i.e., data flow) is selected by switching device 130. In other words, the control circuit/processor (e.g., microcomputer 840 discussed below) can be configured to perform a lossless switch from the first media data to the second media data by controlling the media stream output to start fetching and outputting the stored second media data at a top of a frame of the first media data, such that first media data is cleanly switched to the second media data when played out on the connected A/V device, as will be described in greater detail below.

According to the exemplary embodiment, the receiving device 100 is configured to perform lossless switching from receiving primary and redundant multicast streams to receiving a new multicast stream without experiencing any discontinuity between switches and also without increasing (possibly doubling) the bandwidth consumption during the switching of multicast signals.

FIGS. 3A-3I illustrate block diagrams of a process of the receiving device performing lossless switching in a redundant multicast network in accordance with an exemplary embodiment. As initially shown in FIG. 3A, receiver 120A is receiving a primary multicast stream 210A (hereinafter referred to as "flow A1") and receiver 120B is receiving a redundant multicast stream 210B (hereinafter referred to as "flow A2"). It should be appreciated that while flow A1 is referring to as a primary multicast stream and flow A2 is referred to as a redundant multicast stream, these two flows (as well as flows B1 and B2) can be considered interchangeable since they will be transmitted from a content source as identical media streams in accordance with known redundancy techniques described above. Moreover, it is noted that the details of the components within receivers 120A and 120B are not shown in detail in FIG. 3A-3I in order to clarify the illustration of the exemplary embodiment. However, as shown, and in accordance with conventional redundancy protocols, using SMPTE 2202-7 for example, redundant flow A2 is provided to receiver 120B. A redundant flow 210C is then provided from receiver 120A to switching device 130. At this point, switching device 130 is controlled by the control circuit, based on an IGMP (Internet Group Management Protocol) switch request, to select the output from receiver 120A by switching signal 230. In other words, the switching device 130 is managed by observing validity of flows A1 and A2, and, if either flow is in error, then packets from the other flow are selected so that the media data can be output to an A/V device to be presented thereon. Moreover, this switching can occur on a packet by packet basis and can be considered an internal mode. Thus, it should be appreciated that redundant flow A2 is providing a full media stream and replacing any lost IP packs of flow A1 with corresponding IP packets in flow A2.

Figure 3A:
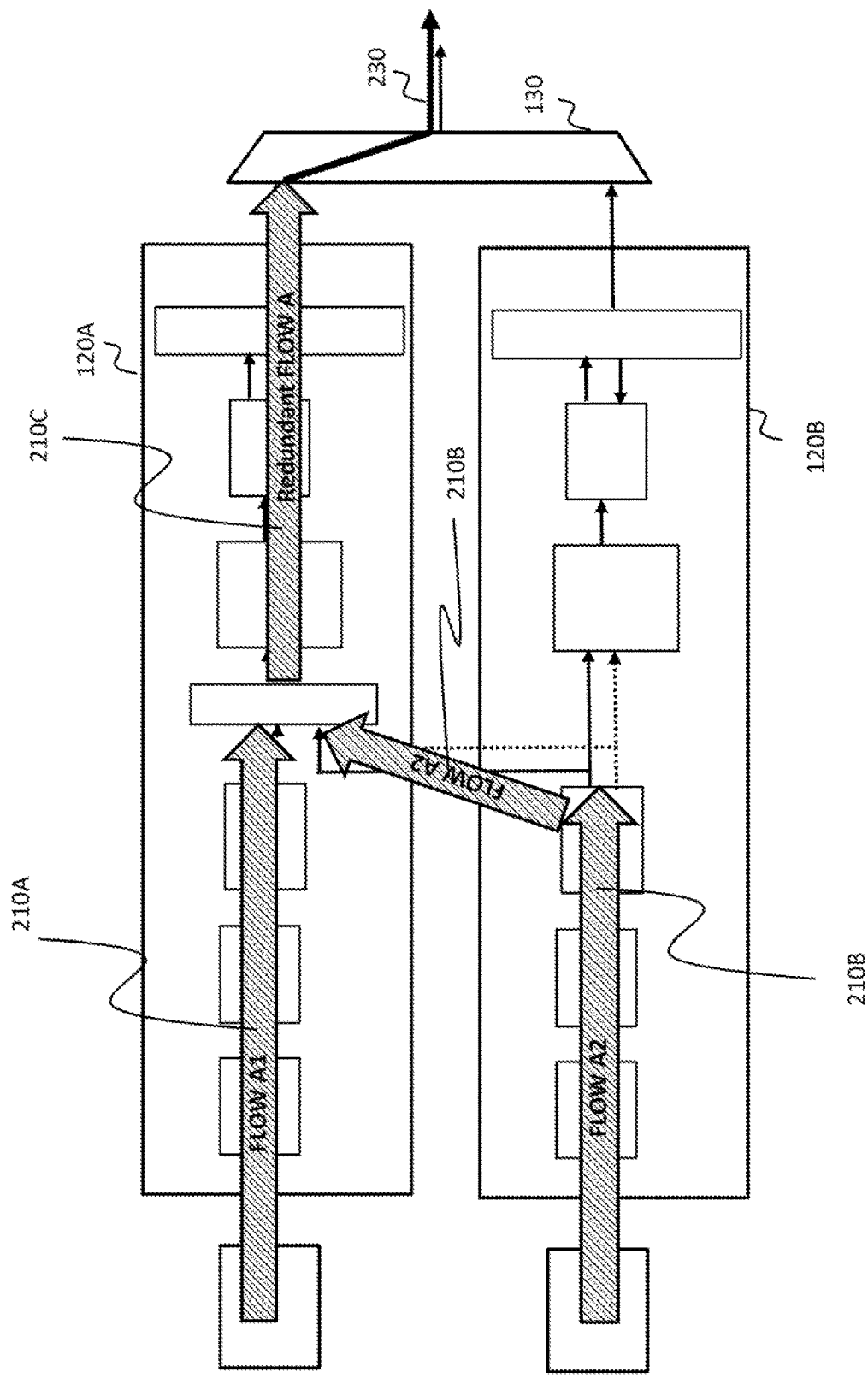
Figure 3B:
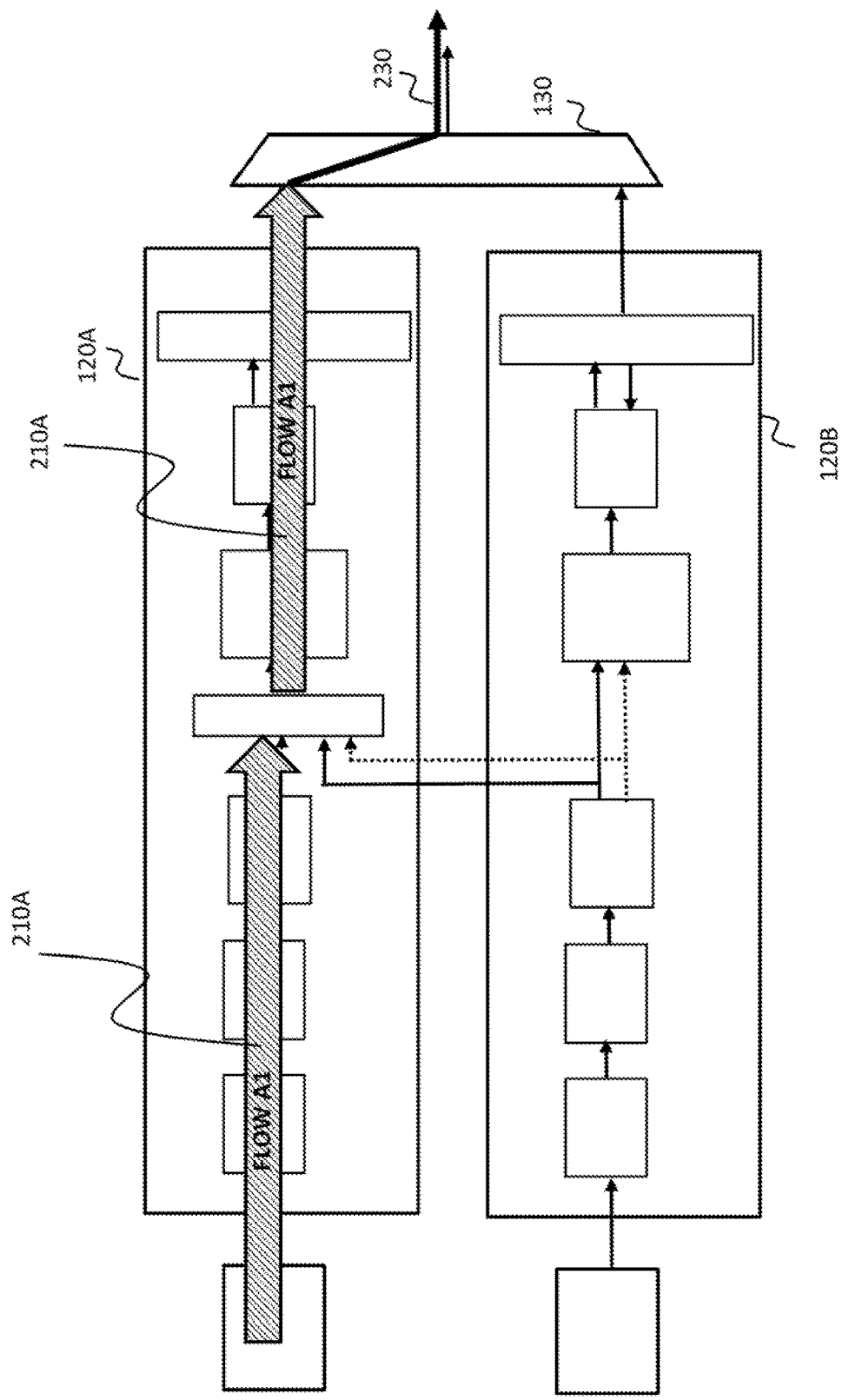

Next, as shown in FIG. 3B, redundancy is disabled by the external control circuit, which forces receiver 120A into external mode. Accordingly, as shown, flow A2 is no longer received by receiver 120B and only flow A1, i.e., the primary multicast stream 210A, is provided to switching device 130 and ultimately displayed by the connected media device. It should be appreciated that this process is triggered by a request from the external control circuit to switch away from a first multicast stream by issuing an IGMP leave command and then join a second multicast stream. Advantageously, no glitch is seen by the receiving device as it continues to receive the primary multicast stream 210A. Thus, the system is leaving flow A2 on receiver 120B, which is then receiving no signal/stream. By design, no disturbances are seen on receiver 120A.

Figure 3C:
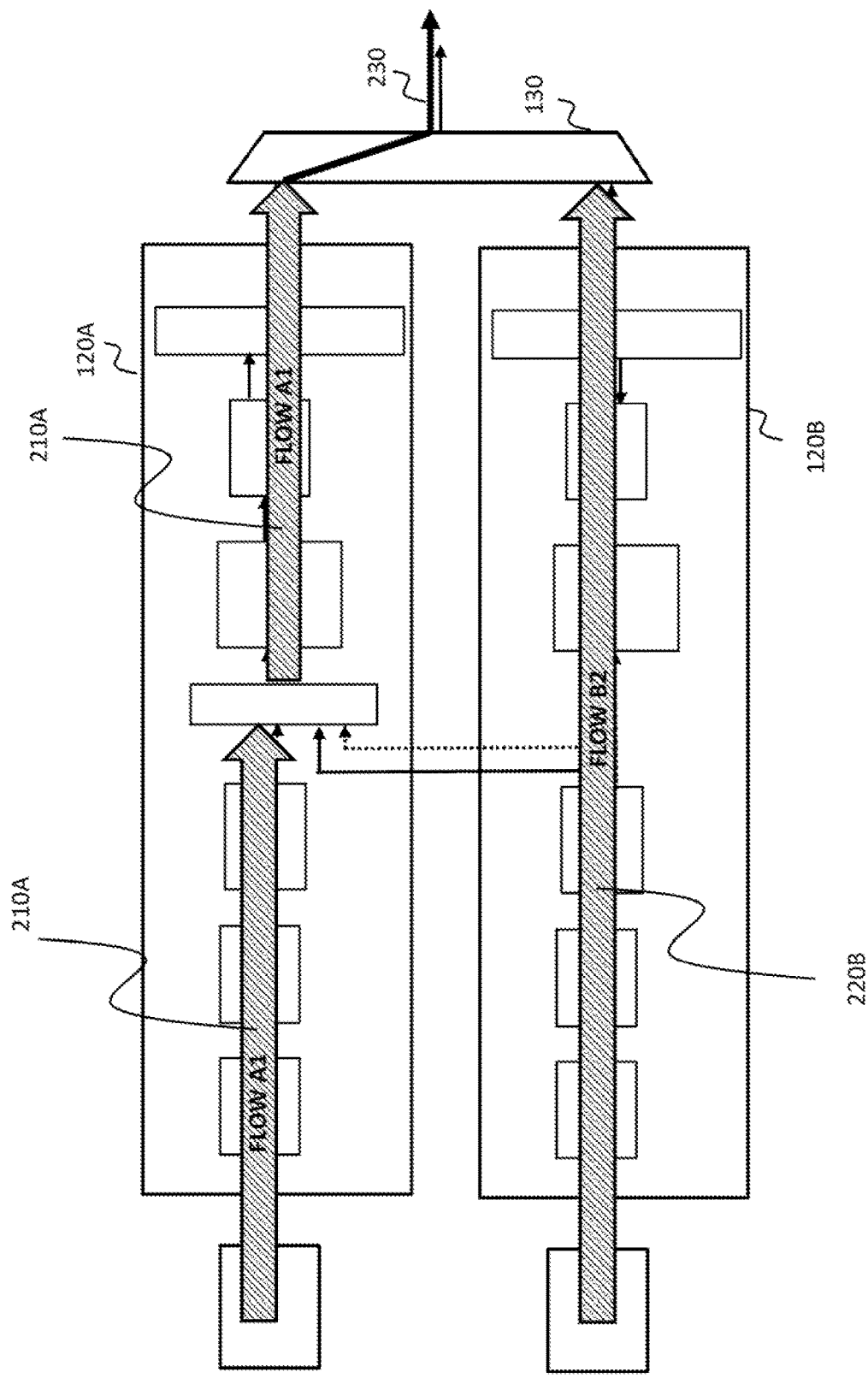

At this point as shown in FIG. 3C, the external control circuit configures the Ethernet MAC port of receiver 120B to join a second primary multicast stream (hereinafter referred to as "flow B2"). After a short period of time, receiver 120B outputs flow B2 aligned on reference to switching device 130. As will be explained in more detail below, alignment is achieve by a media stream alignment controller that inspects the RTP sequence count located in the RTP header of the packet of each flow. These count values must be lined up to execute the redundant packet by packet protection switch. Moreover, the RTP time stamp, also in the RTP header, only changes value at the top of frame. This is the point in time when the clean switch should occur. Thus, it is possible to simplify the alignment if an external reference is present, such that the video signals of the two flows can use the same reference and the RTP time stamp values are locked in phase. In this case, the top of frame can be predicted and used to establish the alignment point.

Figure 3D:
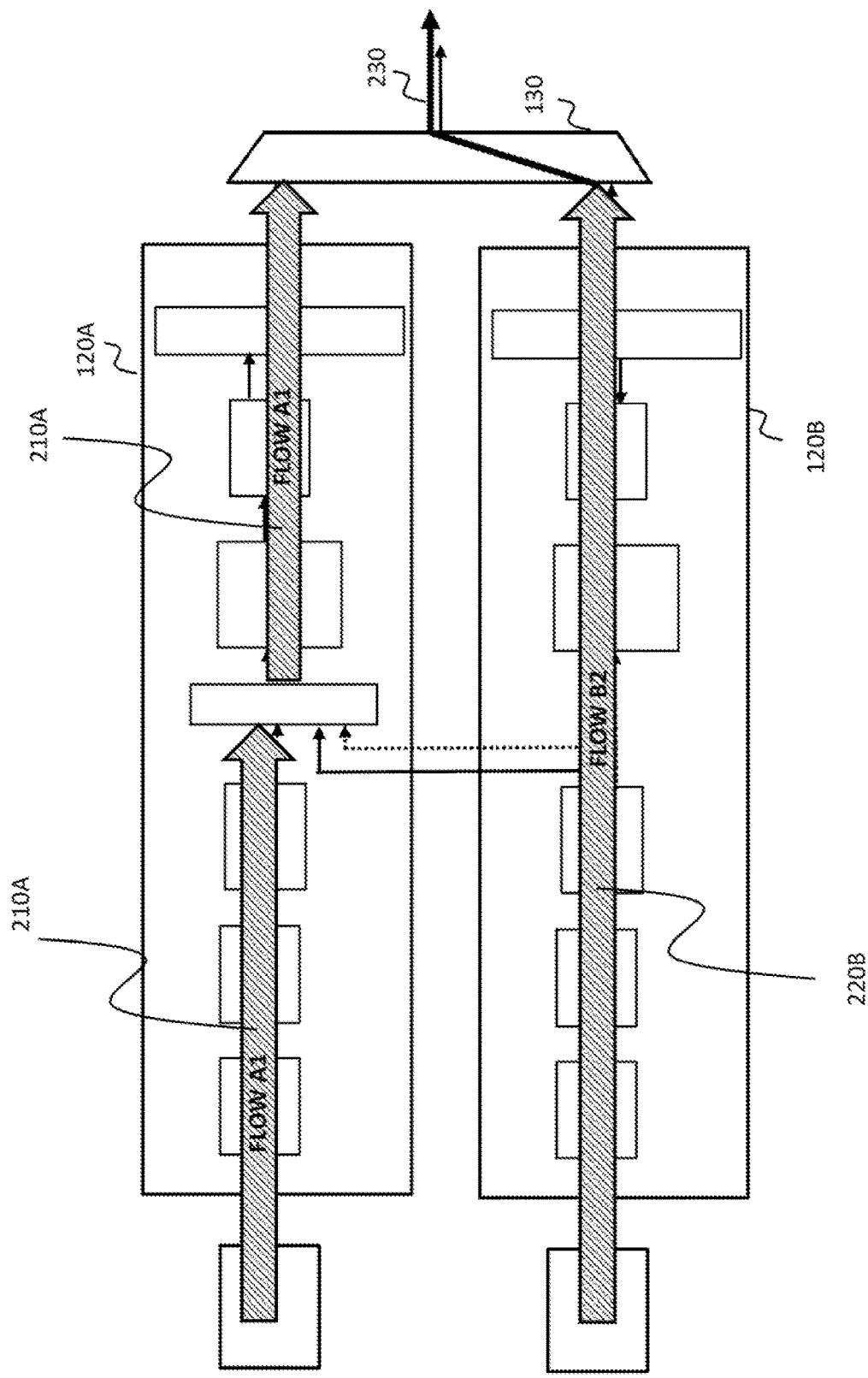

Then, as shown in FIG. 3D, the external circuitry controls the exact times at which commands to switch the video section of the video/audio switching device 130 are executed. Thus, the external circuit (e.g., a microcomputer) is able to provide vertical interval switching from the first primary multicast stream A1 to the second primary multicast stream B2 without the receiving device experience any glitches. According to the exemplary embodiment, the switching operations of switching device 130 are performed identically to using the SDI format for video streams SMPTE RP-168 recommended practice (i.e., "for synchronizing video switching defined vertical interval switching point"). Thus, as shown, the switching signal 230 is coupled to the output of receiver 120B. Effectively, the receiving device has switched from a current multicast stream to a new multicast stream without experiencing any glitches (i.e., small periods of discontinuity) and without consuming unnecessary bandwidth.

Figure 3E:
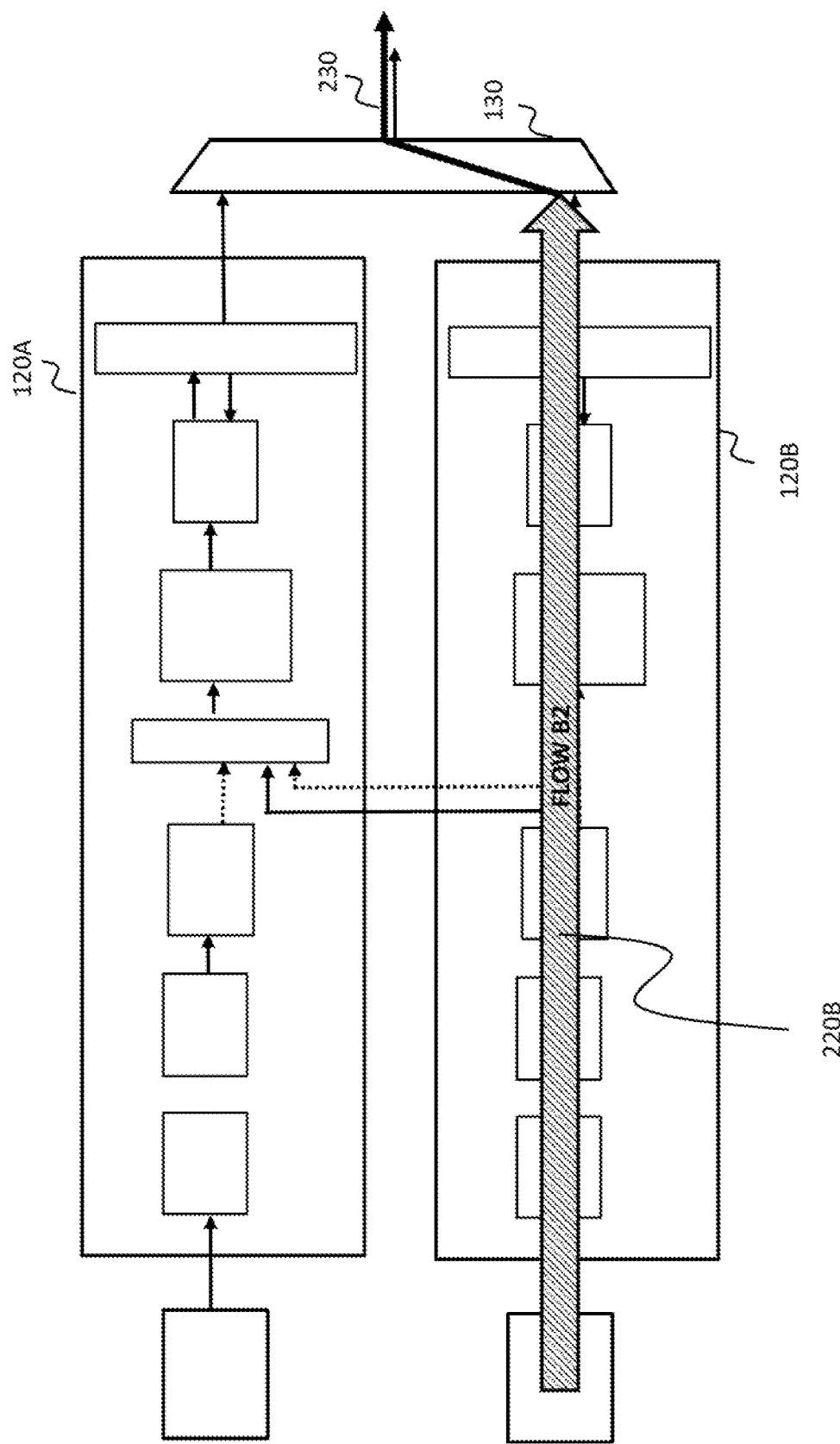

Next, as shown in FIG. 3E, the original multicast stream flow A1 is disconnected, such that redundancy can then be provided for the new multicast stream B2. To do so, the receiving device must enable redundancy without resetting the second recorder (i.e., packet recorder 123B of FIG. 2) on receiver 120B, which is already running for flow B2. In accordance with this process, the receiving device restarts the packet player (i.e., packet player 126A) of receiver 120A at address 0 and then waits for the address of the recorder (i.e., packet recorder 123B) of receiver 120B to cross zero before starting to write to the memory bank (e.g., memory bank 125A). As a result, the receiving device is configured to impose a latency equivalent to the memory depth.

Figure 3F:
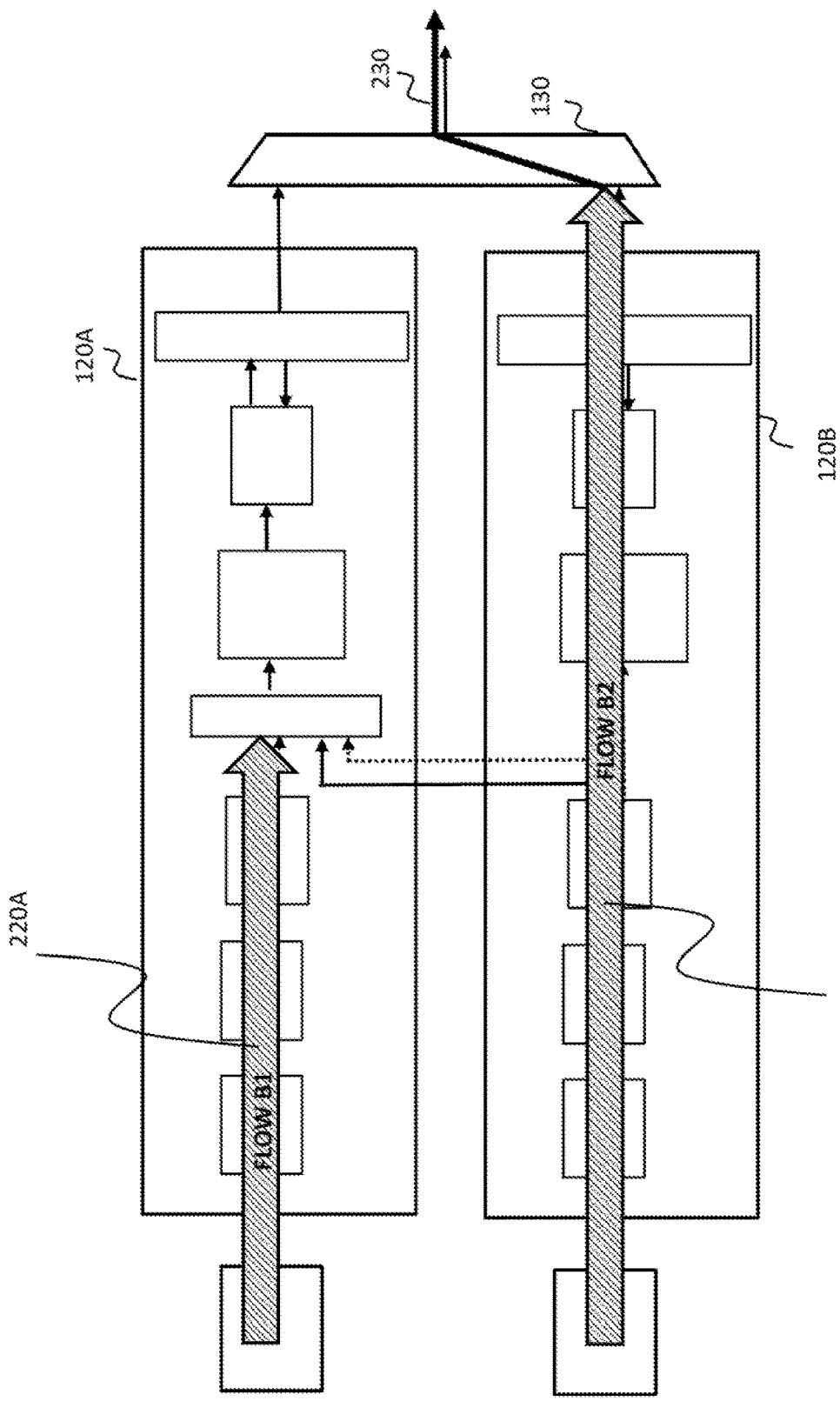
Figure 3G:
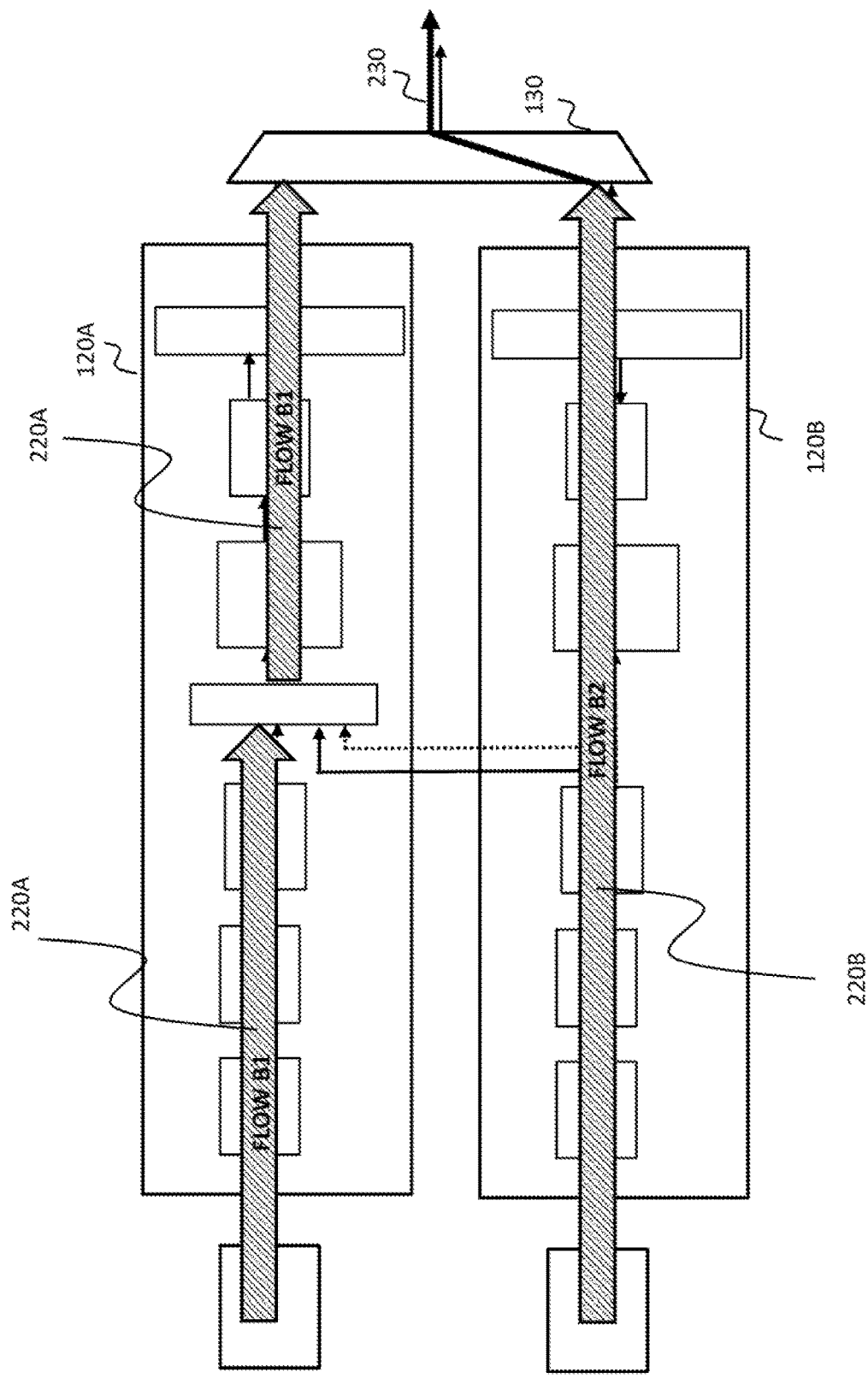
Figure 3H:
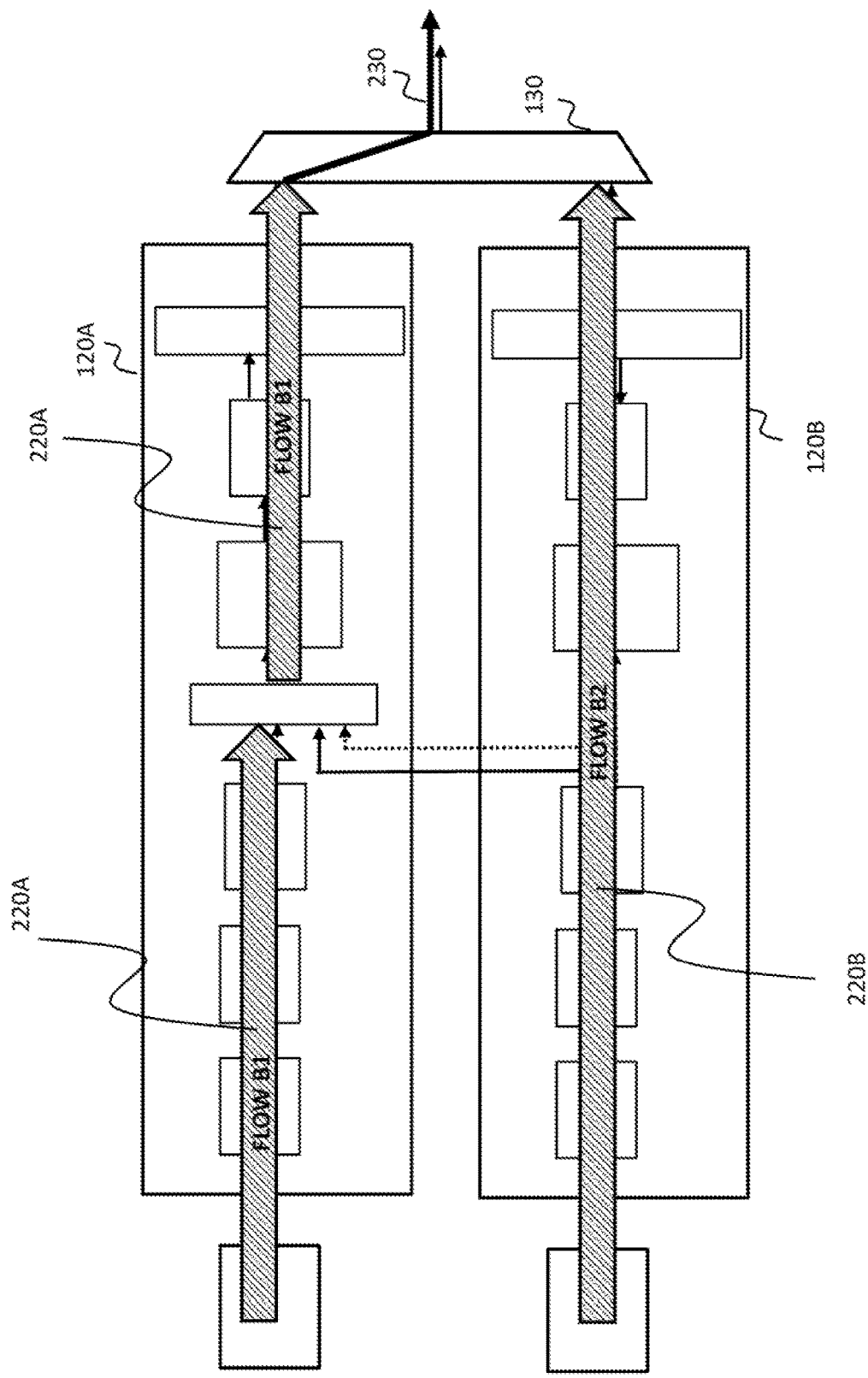
Figure 31:
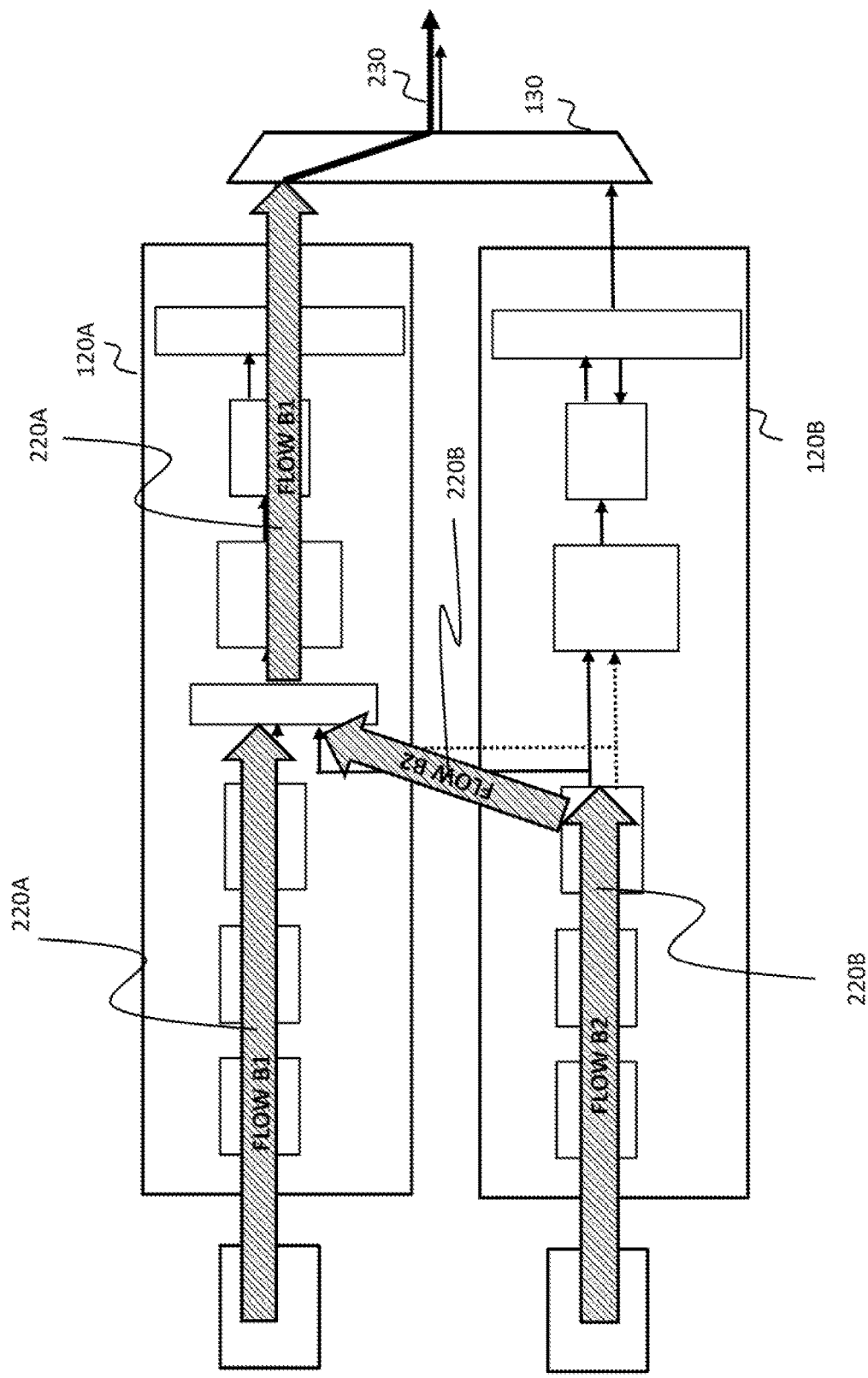

Once the recorder of receiver 120B crosses zero, the external control circuit joins the redundant multicast stream (hereinafter referred to as "flow B1") for the new multicast stream flow 220A. In particular, as shown in FIG. 3F, flow B1 is joined to the Ethernet MAC port of the receiver. After a moment, the new multicast stream is redundant and aligned as shown in FIG. 3G and the switching device 130 can switch signal 230 to receiver 120A, as shown in FIG. 3H. Finally, as shown in FIG. 3I, the flow B2 can be provided to receiver 120A as a redundant signal for the new multicast media stream in a similar manner as discussed above with regard to the original multicast signal. Thus, it should be appreciated that the disclosed receiving device provides a clean joining of the new multicast stream using the redundant channel without having to increase bandwidth consumption.

Figure 4A:
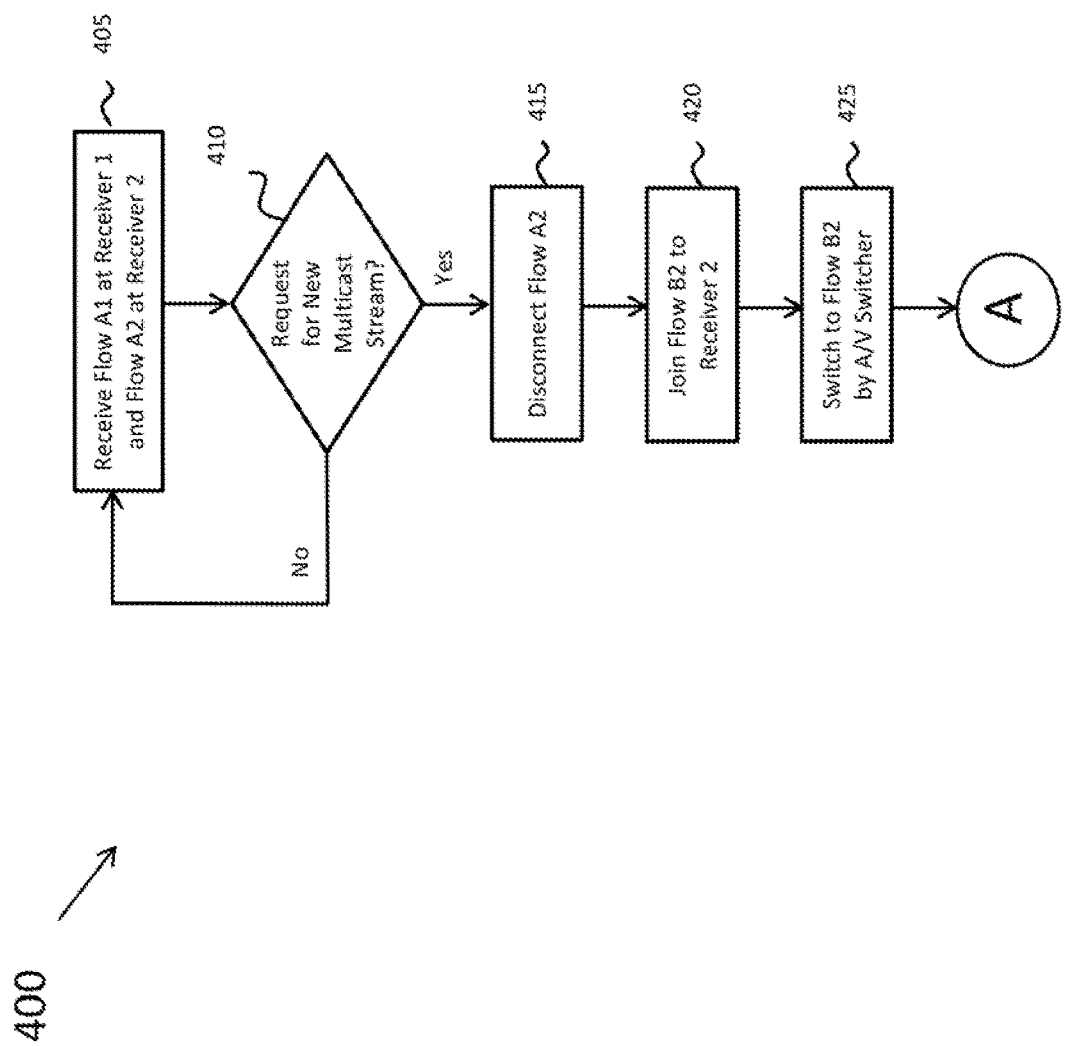
FIGS. 4A and 4B illustrate a flowchart for a method for performing lossless switching in a redundant multicast network in accordance with an exemplary embodiment.
Figure 4B:
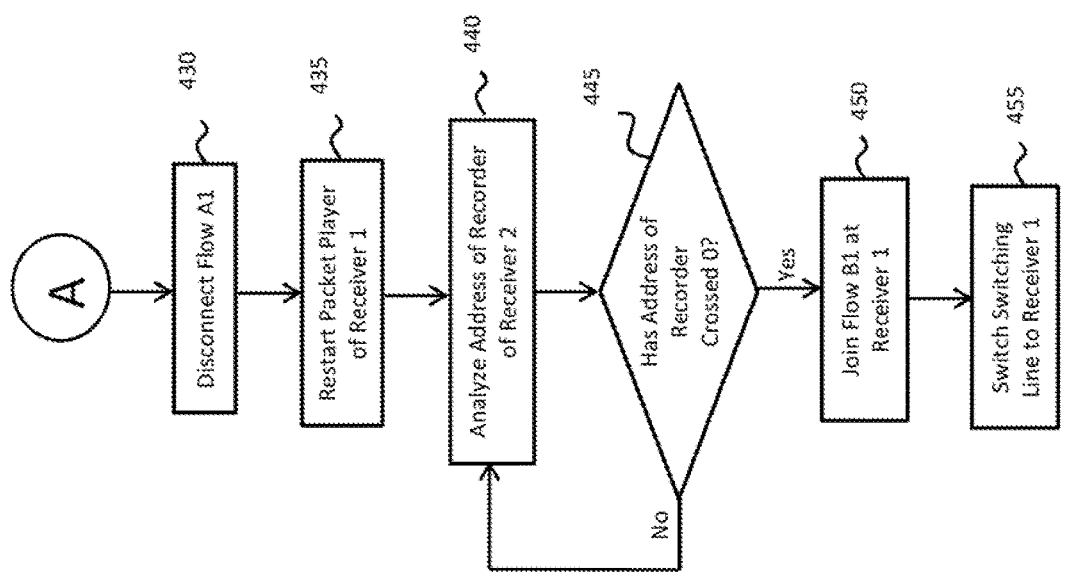

FIGS. 4A and 4B illustrate a flowchart for a method 400 for performing lossless switching in a redundant multicast network in accordance with an exemplary embodiment. It should be appreciated that the algorithms of method 400 can be performed by microcomputer 840, described below.

As shown, initially, at step 405, a first receiver 1 (i.e., receiver 120A discussed above) receives a primary multicast stream (e.g., "flow A1") and a second receiver 2 receives a redundant multicast stream (e.g., "flow A2"). Next, at step 410, the receiving device waits for the external control circuit (e.g., a microcomputer) to request a new multicast stream. If no request is made, the method returns to step 405 and continues to receive flows A1 and A2. Once a request to receive a new multicast stream is made at step 410, the method proceeds to step 415 and disconnects redundant flow A2 from receiver 2, forcing receiver 1 into external mode. As further shown, at step 420 a second primary multicast stream (e.g., flow B2) is joined to receiver 2. For example, the external control circuit controls the Ethernet MAC port of receiver 2 to join flow B2. A/V switcher 130 is then configured to perform a clean switch to flow B2 received by receiver 2. Effectively, the receiving device has switched from a current multicast stream to a new multicast stream without experiencing any glitches (i.e., small periods of discontinuity) and without consuming unnecessary bandwidth.

Next, the method advances to the steps shown in FIG. 4B. At step 430, the original multicast stream flow A1 is disconnected by a media stream disconnector (e.g., microcomputer 840) from receiver 1 by the controller of the receiver to initiate the media stream switching process. By disconnected the original multicast stream flow A1, the media stream switcher can begin the process of switching the two record channels from receiving the redundant data streams of the first media data to receiving redundant data streams of the second media data, but without increasing the total amount of data streams received by the receiver as should be appreciated to those skilled in the art.

In any event, at step 435, the receiving device restarts the packet player (i.e., packet player 126A) of receiver 1 at address 0 and proceeds to step 440 to monitor and wait for the address of the recorder (i.e., packet recorder 123B) of receiver 120B to cross zero. At step 445, it is determined whether the address of the recorder has crossed 0. The method returns to step 440 and continues this loop until the address crosses 0. At this point, the external control circuit joins the redundant multicast stream (e.g., flow B1) for the new multicast stream flow B2. As a result, the new multicast stream is redundant and aligned as described above. Finally, the A/V switcher 130 can switch the switching signal 230 to receiver 1 to receiver the redundant flow of the new multicast stream. According to the exemplary method, a clean joining of the new multicast stream is provided using the redundant channel without increasing bandwidth consumption.

Figure 5:
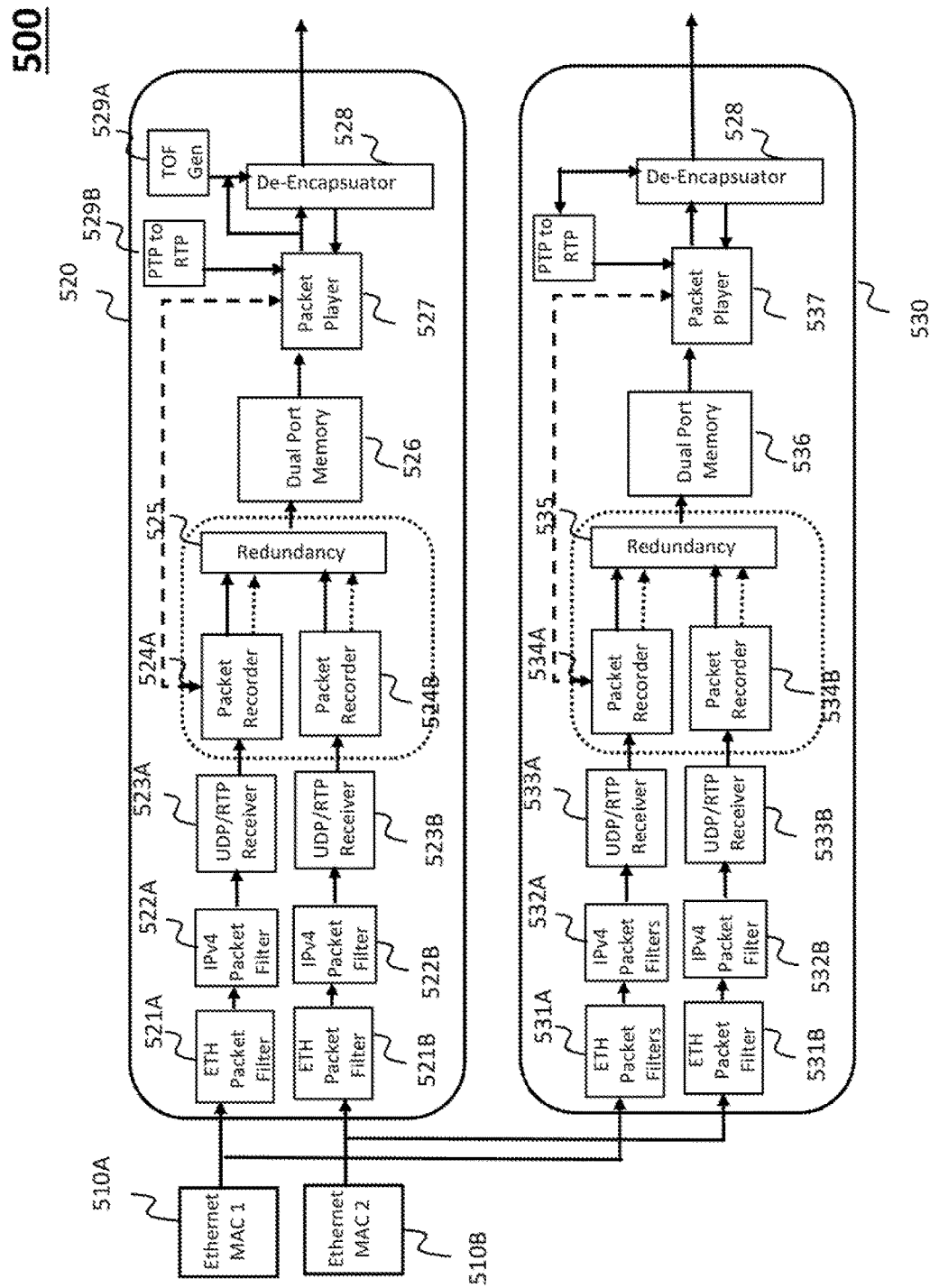
FIG. 5 illustrates a block diagram of a receiving device configured to perform lossless switching in a redundant multicast network in accordance with an exemplary embodiment.

FIG. 5 illustrates a block diagram of a receiving device 500 configured to perform lossless switching in a redundant multicast network in accordance with an exemplary embodiment. As shown, the receiving device 500 is a refinement to the embodiment described above with respect to FIG. 2, and includes a pair of receivers 520 and 530, which are each coupled to Ethernet MAC ports 510A and 510B, respectively, configured to receive multicast data streams from a network as described above.

Each of receiver 520 and 530 comprises a pair of recorder channels that are coupled to the Ethernet MAC ports 510A and 510B, respectively. In one aspect, these recorder channels can viewed similarly to receivers 120A and 120B described above with respect to FIG. 2. In any event, as shown, the media stream received (e.g., a primary multicast media stream) by Ethernet MAC port 510A is input to Ethernet packet filter 521A and the media stream received by Ethernet MAC port 510B (e.g., a redundant multicast media stream) is input to Ethernet packet filter 521B. The respective packet filters 521A and 521B are provided to pass or block IP packets at the network interface based on the source and destination addresses, ports, and/or protocols. The respective multicast streams are then filtered by IP (e.g., IPv4) packet filters 522A and 522B, respectively, which further filter the IP packets as understood to one skilled in the art. The filtered media streams are then received by the UDP/RTP receivers 523A and 523B, respectively. As is known to those skilled in the art, the UDP/RTP packet includes an RTP packet header with a 32-bit synchronization timestamp (i.e., a "RTP timestamp") and an 16 bit sequence number; essentially a datagram counter. The UDP/RTP receivers 523A and 523B are configured to parse the header information to use the time stamps and sequence number for alignment of signals as discussed below.

Figure 6:
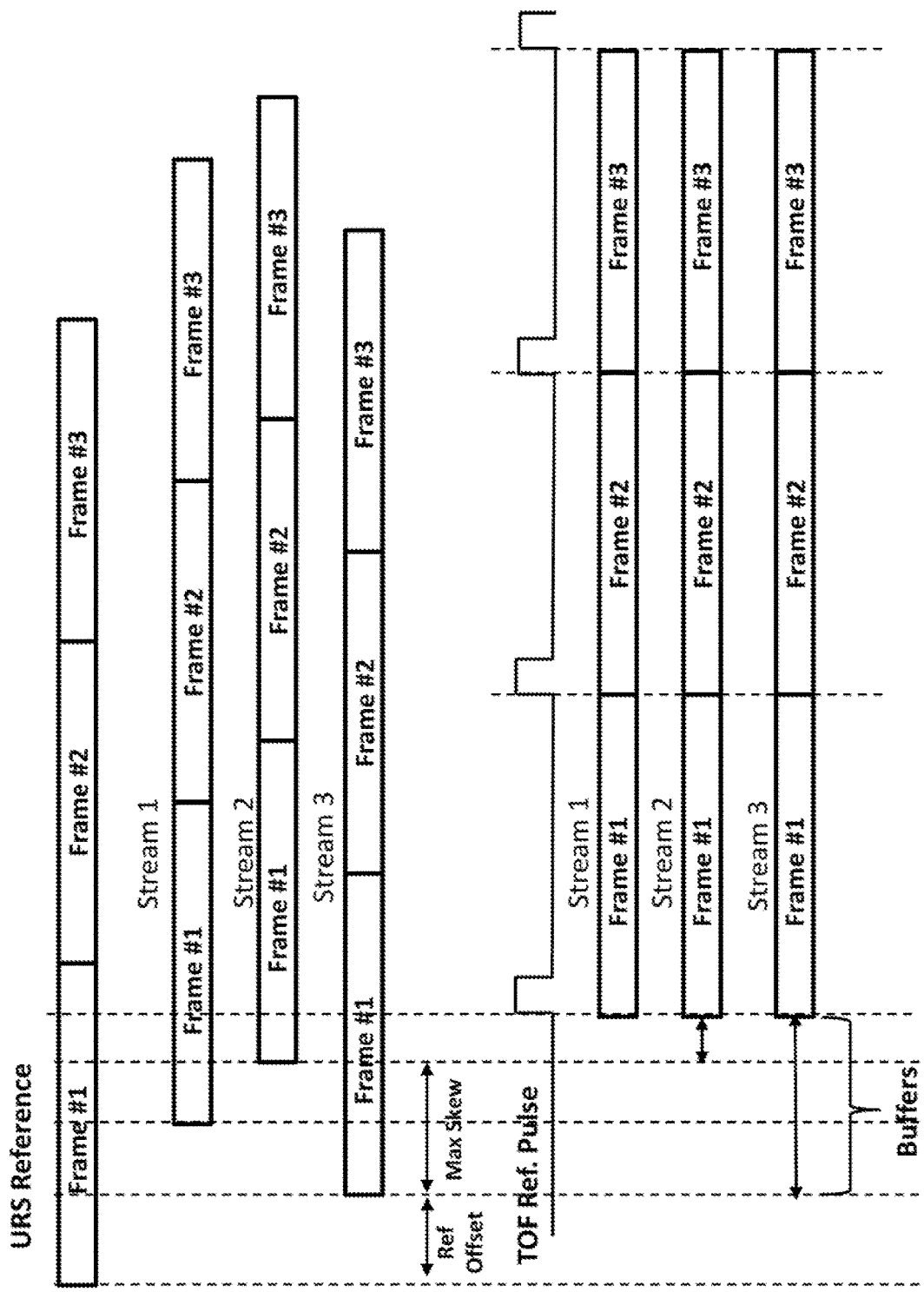
FIG. 6 illustrates a timing diagram aligning media streams to a reference using a TOF indication in accordance with an exemplary embodiment.

Once parsed, the media streams are input to respective packet recorders 524A and 524B, respectively, which are configured to receive the media streams and facilitate alignment. For example, FIG. 6 illustrates a timing diagram aligning media streams to a reference (e.g., a "universal routing server" or URS reference) using a TOF ("top of Frame") indication from the timecode generator. As shown, a number of streams (shown as three streams) each having a plurality of frames (e.g., frames #1 through #3) are received by a receiving device using SMPTE 2202-6 protocol, for example. However, due to network jitters, the data packets for each stream will often be delayed, causing variations when each stream is received. Thus, stream 3, which may be a redundant stream, for example, may be received before either of streams 1 and 2 and all will be offset from one another. As shown, stream 3 may have a reference offset from the reference and a maximum skew between stream 3 (received first) and stream 2 (received last). Over time, the delay will significantly increase.

Accordingly, in order to align the different multicast streams, buffers are used where the streams are temporarily stored until all streams are received. The alignment process is shown in FIG. 6 and performed by media stream alignment controller (e.g., microcomputer 840 can be configured to execute the alignment process). A TOF indication from a timecode generator can be used to sample each frame from each stream stored in the buffers.

It should be appreciated that alignment to reference of multiple flows is preferable when clean-switching as per RP-168 is required by the application. Moreover, time stamps alone cannot be used for this because granularity of time stamps is too large (e.g., in RFC-4175, for example, the granularity of the time stamps is 11 μs). Moreover, time stamps are expected to have some wander with respect to the local PTP time, due to the multiple PLLs in the system to lock to PTP. This wander will generate a beating of the skew of all streams, leading to alignment error bigger than the switch window. Accordingly, the exemplary receiver achieves alignment by providing the same TOF pulse to all flows as shown in FIG. 6. The possible range is defined by buffer depth minus provisions for packet delay variations.

Now, referring back to FIG. 5, the packet recorders 524A and 524B are provided as temporary buffers to store the filtered media streams before playout. As shown, the packet player 527 is communicatively coupled to the packet recorders 524A and 524B and provided to prefetch packets from dual port memory 526, so that the packet player 527 is ready when the de-encapsulator 528 requests a packet. Thus, as shown the de-encapsulator 528 includes an output fed back to packet player 527 and is configured to provide a flow control signal to prevent the packet player 527 from pushing the packets. Otherwise, the packet player 527 would push bursts of packets. As noted above, the receiving device 500 includes a timecode generator 529A that generates TOF signal. The de-encapsulator 528 is paced by this media clock and will consume data on the rate provided by the TOF signal.

Moreover, according to the exemplary embodiment, the packet player 527 is paced by two signals as shown. The media rate of the TOF signal and possibly timestamps of the IP packets. Thus, the packet player 527 can be viewed as both a master and a slave. It is a master when it is using time stamps to decide whether a packet should be output, but at the same time the packet player 527 can only output packets if the de-encapsulator 528 allows it through flow control as described above. Thus, the de-encapsulator 528 is configured to de-encapsulate the media streams according to the SMPTE 2022-6 standard and has very little buffering to minimize latency. It should be appreciated that the de-encapsulator can work equally well with RFC 4175 and other proposed SMPTE standards such as ST 2110-20.

According to a further aspect of this embodiment, the packet player 527 is configured to wait until a certain number of packets are in the dual port memory 526 before starting to read the packets. Then, if a TOF indication is used to align the streams, the actual buffer operating level will depend on the relative position of that TOF as described above with respect to FIG. 6. Otherwise, the buffer level stays on average around the startup level.

Figure 7:
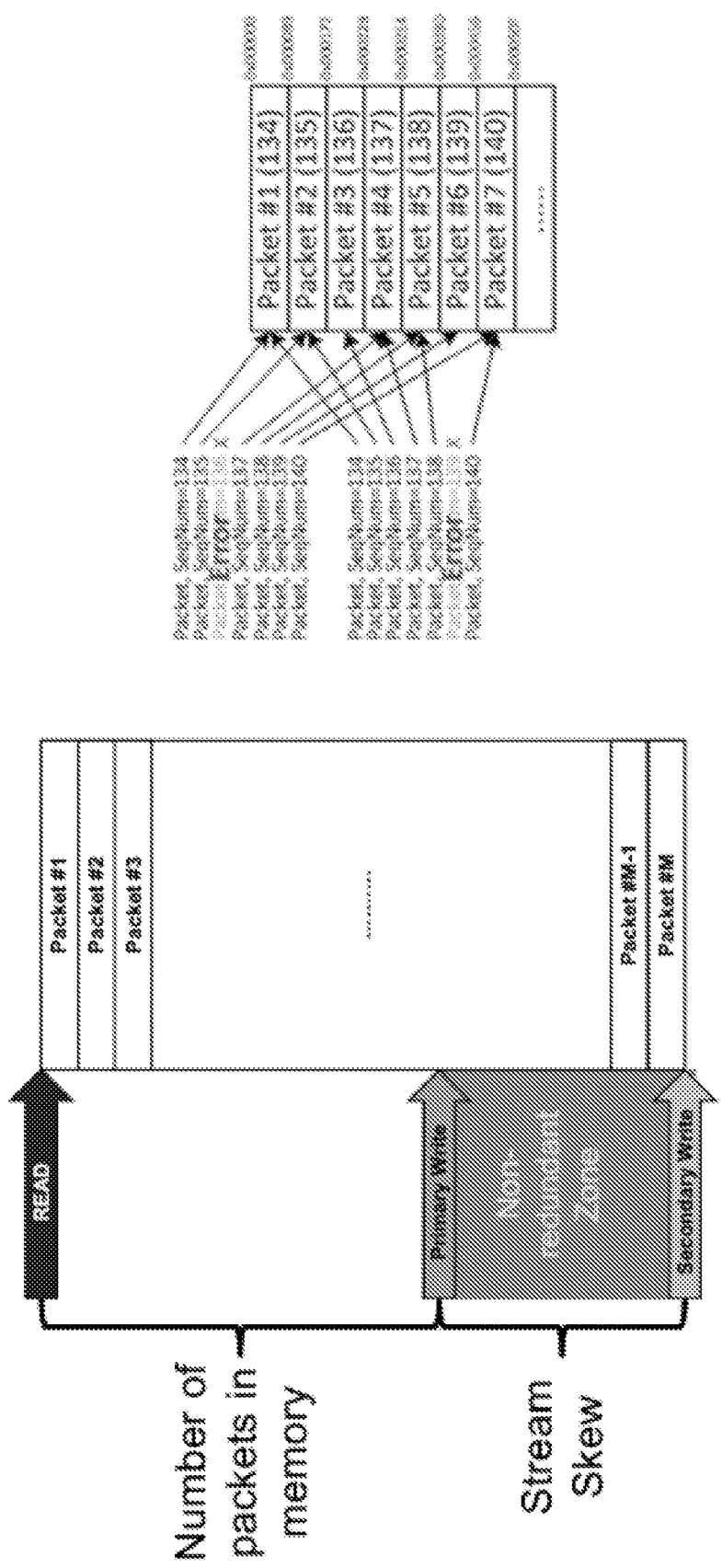
FIG. 7 illustrates a packet index mapping of the packet recorder of the receiving device for perform lossless switching in a redundant multicast network in accordance with an exemplary embodiment.

FIG. 7 illustrates a packet index mapping of the packet recorder of the receiving device for perform lossless switching in a redundant multicast network in accordance with an exemplary embodiment. According to an exemplary embodiment, the packet recorder (e.g., packet recorder 524A) makes use of the 16-bit sequence number found in the RTP header to organize the packets into memory. As shown, the shared memory is divided into multiple packet banks having a fixed size that is large enough to accommodate a maximum size for a packet of each media stream.

Thus, the first packet of a first data flow (e.g., RTP flow 1) can be stored by packet recorder 524A in the shared memory as Packet #1 at packet index 0 (first packet always mapped to 0) using the sequence number 134 in this example. It follows that Packet #2, Packet #3 and so forth up to Packet #M, are mapped to packet indexes 1, 2, 3 up to M, for example. As further noted, the mapping function will map every sequence number linearly to a unique "packet index" in the memory as shown. This process allows packet reordering to take place and this is how mis-ordered packets are re-ordered in memory. Similarly, a second flow (e.g., RTP flow 2), which is a redundant media stream in this example, will see its packet with sequence number 134 mapped to packet index 0 as well. Identical packets coming from the 2 flows are hence written to the same memory location, for example. Thus, the controller operates as a media stream redundancy controller that stores the primary stream (i.e., RTP flow 1) and replaces any packets that are missing or the like with corresponding data packets from the redundant stream (i.e., RTP flow 2).

Thus, in this exemplary aspect, if a packet is in error (for example packet #3 of flow 1), using a CRC check for example as discussed above, or even missing, it is never written to memory. The assumption is that the other flow source will have the packet and write it to the shared memory by the media stream redundancy controller. The result is a reconstructed, ordered flow of RTP packet payloads as shown, e.g., Packet #1 (134), Packet #2 (135), Packet #3 (136) . . . Packet #7 (140) and so forth. As a result, the receiver uses a single shared memory (i.e., dual port memory 128) for both the first RTP data flow 1 (e.g., a primary multicast media stream) and the second RTP data flow 2 (e.g., a redundant multicast stream).

Because both streams are stored in a shared buffer, the reader (i.e., packet player channel) must take into account two "virtual" write pointers, and anyone of them may stop advancing if the stream is lost completely. The pointers are said "virtual" because in reality packets are written to memory by the recorder channel one after the other sequentially. In reality, there is a single write pointer per recorder channel that "jumps" back and forth to write packets from both flows. In essence though, the number of redundant packets that are in the memory is the difference between the latest writer and the reader. The difference between the two "virtual" write pointers is equivalent to the skew between the streams. For example, we may receive flow 1 packet number 15 and right after receive flow 2 packet number 25 due to an unequal delay of the two network paths. Then the first "virtual" write pointer would point at packet index 12, for example, and the second would point much farther to packet index 12+(25-15)=24. Although reading the packets could start almost right away, the redundancy is really only available after a time equivalent to the skew between the streams as should be understood to one skilled in the art.

Moreover, as mentioned above, if one of the flows completely goes away, its "virtual" pointer disappears completely and the write pointer stops "jumping". This does not create any problem for the player read pointer as it is normally far behind. The buffer simply appears as if it suddenly contained more/less packets. Ultimately, when the flow comes back, its sequence numbers with respect to the other flow will cause the "virtual" write pointer to land with the exact same prior relationship (provided the skew is the same) which guarantees that everything is redundant again.

Again, referring back to FIG. 5, it can be seen that the packet recorders 524A and 524B can perform the redundancy function 525 and store the packets of each received media stream into the buffer (i.e., dual port memory 526) according to the technique described above with respect to FIG. 7. Moreover, the packet player 527 is configured to pull the packets from memory 526 as described above. As further shown, the packet player 527 receives an PTP to RTP signal 529B based on the network timing. The PTP signal is provided to synchronize the clocks throughout the system and preferably achieves clock accuracy in the sub-microsecond range, making it suitable for the control system. Accordingly, it should be appreciated that the receiver 520 is configured to provide for a "clean switch" of the received multicast streams without doubling the required bandwidth of video during the switch operation, such as IGMP joining a new video stream before IGMP leaving the current video stream.

Employing the components described above, the receiver 520 is configured to perform the lossless switching from a current multicast stream to a new multicast stream using the protocols discuss above with respect to FIGS. 3A-3I. In one refinement of the embodiment, a second receiver 530 is shown in FIG. 5 and includes the same components as described above for receiver 520. In particular, the media stream received by Ethernet MAC port 510A can also be input to Ethernet packet filter 531A and the media stream received by Ethernet MAC port 510B can be input to Ethernet packet filter 531B. The other components (corresponding reference number 53xB) of receiver 530 will not be repeated herein as they include the same functionality as those discussed above for receiver 520. Thus, in this aspect, the receiver 530 can accommodate additional channels (e.g., N+1 channels) to facilitate additional lossless switching of multicast streams in accordance with the method described herein.

Figure 8:
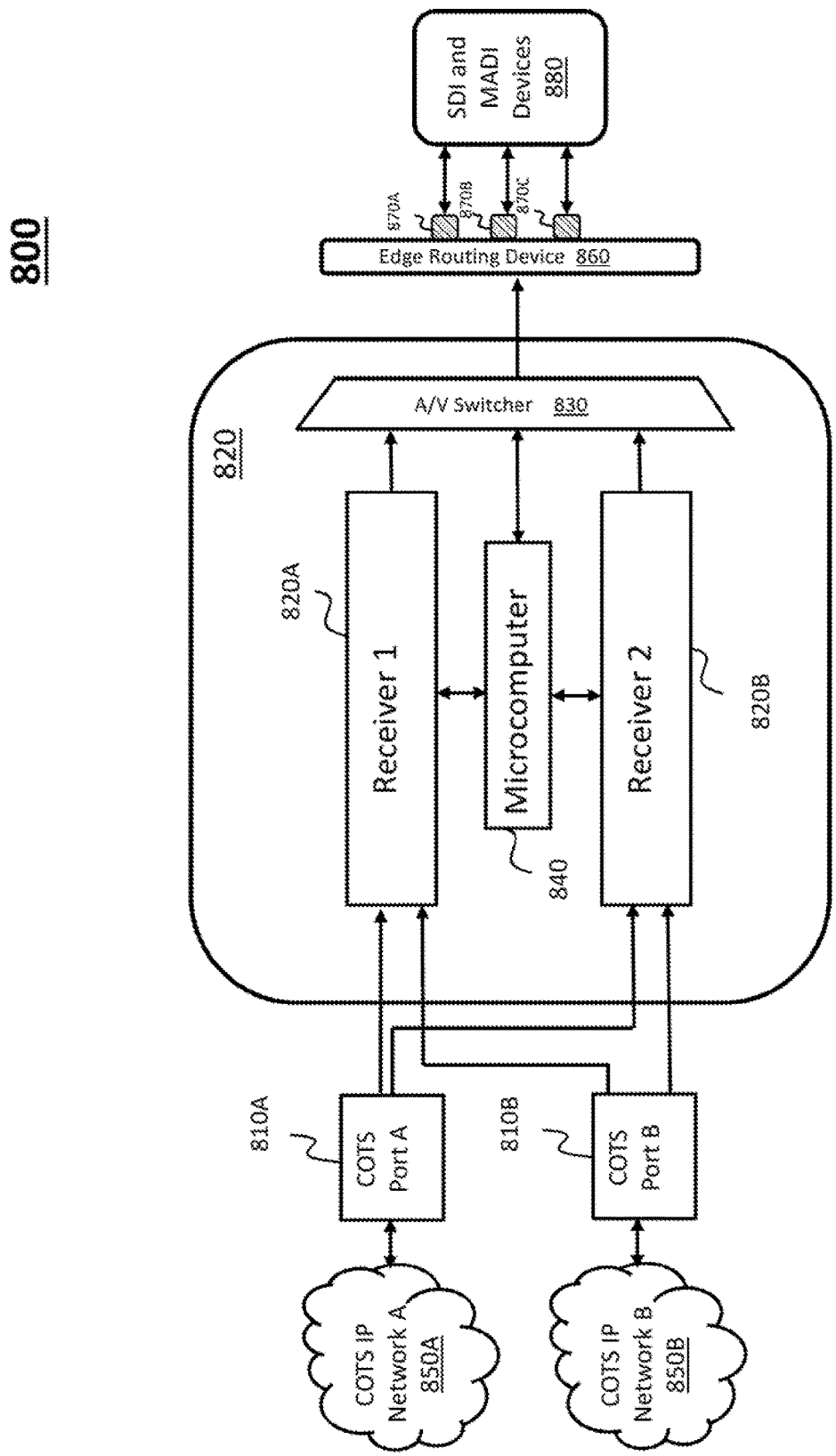
FIG. 8 illustrates a high-level block diagram of a system for performing lossless switching in a redundant multicast network in accordance with an exemplary embodiment.

FIG. 8 illustrates a high-level block diagram of a system for performing lossless switching in a redundant multicast network in accordance with an exemplary embodiment. As shown, the system 800 includes a receiving device 820 that can correspond to receiving device 200 and/or 500 as discussed above. Thus, as shown, the receiving device 820 includes a pair of receivers 820A and 820B with outputs couple to an A/V switcher 830 that can correspond to switching device 130, for example. In addition, as described above, the receiving device can include control circuitry, which can be microcomputer 840 for example. Microcomputer 840 can be a computer processing unit ("CPU"), a microprocessor, or the like, as known to those skilled in the art that is configured to control receivers 820A and 820B and A/V switcher 830 to perform the algorithms described herein.

Moreover, the microcomputer is configured to control the input to COTS ports A and B denoted by 810A and 810B. The COTS ("commercial off-the-shelf") ports A and B can correspond to the Ethernet MAC ports A and B described above. As shown, each COTS port A and B has a pair of outputs coupled to each of the receivers. Moreover, the COTS ports A and B are communicatively coupled to COTS IP networks A and B (denoted by 850A and 850B) as would be understood to one skilled in the art. The A/V switcher 830 includes an output coupled to an edge routing device 860 that can route the outputted multicast media stream to one or more SDI and MADI devices 880 by a plurality of input/output ports 870A, 870B and 870C. In one embodiment, the receiver 820 and edge routing device 860 are a single device.

The system 800 is configured to perform the lossless switching algorithm described above. The following Table 1 illustrates state of flows implementing the disclosed method.

TABLE 1

| States | COTS Port A | Device Port A | COTS Port B | Device Port B | Flow Used |
|---|---|---|---|---|---|
| State 1 | Flow 1 | Flow 1 | Flow 1' | Flow 1' | Flow 1 |
| State 2 | Flow 2 | Align Flows | Flow 1' | Flow 1' | Flow 1' |
| State 3 | Flow 2 | Flow 2 | Flow 1' | Flow 1' | Flow 2 |
| State 4 | Flow 2 | Flow 2 | Flow 2' | Align Flows | Flow 2 |
| State 5 | Flow 2 | Flow 2 | Flow 2' | Flow 2' | Flow 2 |

In general, "Flow 1" and "Flow 2" correspond to primary multicast streams and "Flow 1" (i.e., flow 1 prime) and "Flow 2" (i.e., flow 2 prime) correspond to redundant multicast streams. Thus, at an initial state (i.e., "State 1") the COTS port A is receiving the flow 1 and COTS port B is receiving the redundant flow 1'. Moreover, flow 1 is provided to device port A and redundant flow 1' is provided to device port B. Thus, redundancy is enabled by receiver 820 and the flow used by the receiver is flow 1 unless flow has one or more failed IP packets in which case the receiver 820 will switch to redundant flow 1' using known protocols (e.g., SMPTE 2202-7).

Next in state 2, an IGMP request is provided by the external control circuitry to switch to a new multicast stream (i.e., flow 2). At this point, the flow 1 is dropped and a new flow 2 is added. Thus, the COTS port A can now receive flow 2 while the COTS port B continues to receive redundant flow 1'. The flow 2 is then aligned with flow 1' in accordance with the method described herein at device port A. Meanwhile, the device port B continues to receive redundant flow 1' and receiver also receives and outputs this media stream.

A clean switch is then made at state 3 in which the device port A now receives the flow 2 and the receiver 820 begins to receive a flow using A/V switcher 830. The system 800 next enters state 4 in which the redundant flow 1' is dropped and redundant flow 2' is added at COTS port B. Moreover, redundant flow 2' is aligned with flow 2 and flow 2 continues to be output by receiver 820. At this point, the system 800 reaches full redundancy of flow 2 as described above.

Figure 9:
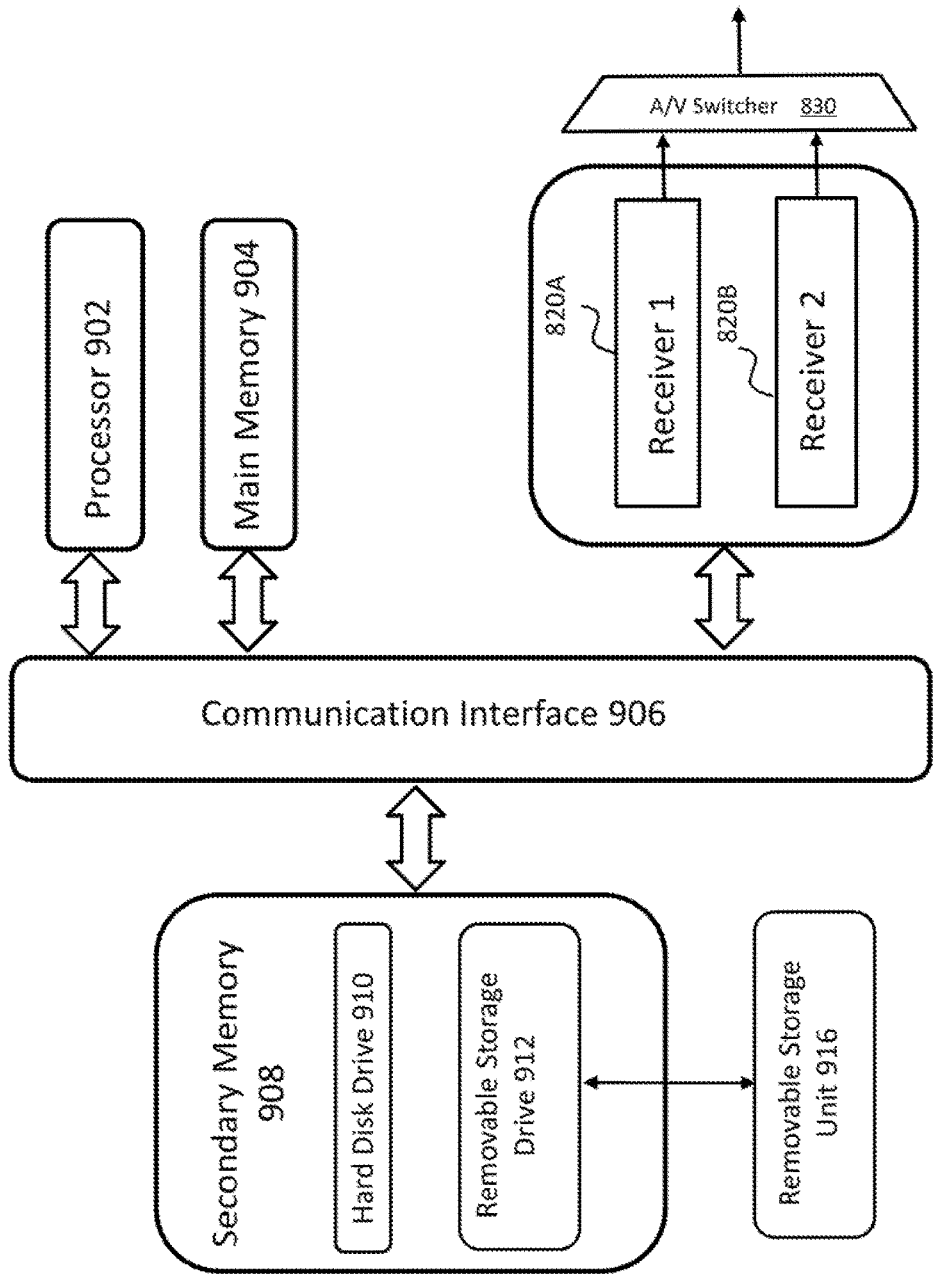
FIG. 9 illustrates an example system diagram of various hardware components and other features, for use in accordance with aspects presented herein.

FIG. 9 illustrates an example system diagram of various hardware components and other features, for use in accordance with aspects presented herein. Aspects presented herein may be implemented using hardware, software, or a combination thereof and may be implemented in one or more computer systems or other processing systems. Aspects include one or more computer systems 900 capable of carrying out the functionality described herein.

As shown, computer system 900 includes one or more processors, such as processor 902, which can correspond to microcomputer 840 in one embodiment, for example. The processor 902 is connected to a communication infrastructure 906 (e.g., a communications bus, cross-over bar, or network). Various software implementations are described in terms of this example computer system.

By way of example, an element, or any portion of an element, or any combination of elements may be implemented with a "processing system" that includes one or more processors. The processing system further includes one or more modules for executed the algorithms described herein. The modules may be software modules running in the processor 902, resident/stored in memory 908, e.g., a computer readable medium, one or more hardware modules coupled to the processor 902, or some combination thereof. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Computer system 900 also includes a main memory 904, preferably random access memory (RAM), and may also include a secondary memory 908. The secondary memory 908 may include, for example, a hard disk drive 910 and/or a removable storage drive 912, representing a floppy disk drive, a magnetic tape drive, an optical disk drive, etc. The removable storage drive 912 reads from and/or writes to a removable storage unit 916 in a well-known manner. Removable storage unit 916, represents a floppy disk, magnetic tape, optical disk, etc., which is read by and written to removable storage drive 912. As will be appreciated, the removable storage unit 916 includes a computer usable storage medium having stored therein computer software and/or data.

In alternative implementations, secondary memory 908 may include other similar devices for allowing computer programs or other instructions to be loaded into computer system 900. Examples of such may include a program cartridge and cartridge interface (such as that found in video game devices), a removable memory chip (such as an erasable programmable read only memory (EPROM), or programmable read only memory (PROM)) and associated socket, which allow software and data to be transferred from the removable storage unit 908 to computer system 900. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Computer programs (also referred to as computer control logic) are stored in main memory 904 and/or secondary memory 908. Such computer programs, when executed, enable the computer system 900 to perform the features of the aspects discussed herein. In particular, the computer programs, when executed, enable the processor 902 to perform the features of the presented herein. Accordingly, such computer programs represent controllers of the computer system 900.

If implemented in software, the functions may be stored on or encoded as one or more instructions or code on a computer-readable medium. Computer-readable media includes computer storage media. Thus, when aspects are the implemented using software, the software may be stored in a computer program product and loaded into computer system 900 using removable storage drive 912, or hard drive 910, for example. The control logic (software), when executed by the processor 902, causes the processor 902 to perform the functions as described herein. In another example implementation, aspects may be implemented primarily in hardware using, for example, hardware components, such as application specific integrated circuits (ASICs). Implementation of the hardware state machine so as to perform the functions described herein will be apparent to persons skilled in the relevant art(s).

Aspects may also be implemented using a combination of both hardware and software. Accordingly, in one or more example aspects, the functions described may be implemented in hardware, software, firmware, or any combination thereof.

While aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed:

1. A media receiver for performing lossless switching of media streams, the media receiver comprising:
   at least two receiver channels configured to receive redundant data streams of first media data, respectively;
   a media player configured to playout the first media data on an audio/video ("A/V") device;
   a media stream switcher configured to switch one of the at least two receiver channels from receiving one of the data streams of the first media data to receiving a data stream of second media data in order to initiate a switch from the first media data to the second media data without increasing a total amount of data streams received by the media receiver;
   a media stream alignment controller configured to align the received data streams of the first and second media data by determining respective real-time transfer protocol ("RTP") time stamps parsed from data packets of the received data streams and phase locking the RTP time stamps of the respective data streams to a top of frame reference signal; and
   a media data playout switcher configured to control the media player to perform a lossless switch between the aligned respective data streams without discontinuity of playout by the A/V device during the switch from playout of the first media data to playout of the second media data.

2. The media receiver according to claim 1, further comprising a media stream redundancy controller configured to store in a media stream buffer the redundant data streams of first media data.

3. The media receiver according to claim 2, wherein the media stream redundancy controller is further configured to store a primary data stream of the first media data in the media stream buffer and replace lost data packets of the primary data stream of the first media data with corresponding data packets from a redundant data stream of the first media data.

4. The media receiver according to claim 2, wherein the media stream switcher is further configured to disconnect a second of the at least two receiver channels from receiving the respective data stream of the first media data and the media stream alignment controller is further configured to control the disconnected second receiver channel to receive a redundant data stream of the second media data to provide redundancy for the second media data.

5. The media receiver according to claim 4, wherein the media stream redundancy controller is further configured to store a primary data stream of the second media data in the media stream buffer and replace lost data packets of the primary data stream of the second media data with corresponding data packets from the redundant data stream of the second media data.

6. The media receiver according to claim 1, wherein the media stream alignment controller is further configured to align the respective received data streams of the first and second media data by determining that an address of the media stream buffer has reset and then controlling a network port of the second receiver channel to receive the respective data stream of the second media data.

7. The media receiver according to claim 2, wherein the media stream buffer is a single shared memory comprising separate memory banks for storing the respective received data streams of the first and second media streams, respectively.

8. The media receiver according to claim 2, further comprising a packet parser configured to parse data packets of the respective data streams of first and second media data to identify respective header information and the corresponding RTP time stamps.

9. The media receiver according to claim 1, wherein the media stream alignment controller is further configured to store the respective data stream of the second media data in the media stream buffer upon alignment of the respective data stream of the first media data based on the respective RTP time stamps of the data packets of the first and second media data.

10. A media receiver for performing lossless switching of media streams, the media receiver comprising:
    a first receiver channel configured to receive an primary data stream of first media data;
    a second receiver channel configured to receive a redundant data stream of the first media data;
    a media player configured to playout the first media data on an audio/video ("A/V") device from at least one of the primary and redundant data streams of the first media data;
    a media stream switcher configured to initiate a switch of the media receiver from receiving the first media data to receiving second media data without increased bandwidth consumption by the media receiver by configuring the second receiver channel to switch from receiving the redundant data stream of the first media data to receiving a primary stream of the second media data; and
    a media stream alignment controller configured to align the received primary data streams of the first and second media data by determining respective real-time transfer protocol ("RTP") time stamps parsed from data packets of the received primary data streams and phase locking the RTP time stamps of the respective primary data streams to a top of frame reference signal; and
    a media data playout switcher configured to control the media player to perform a lossless switch between the aligned respective primary data streams without discontinuity of playout on the A/V device during the switch from playout of the first media data to playout of the second media data from the received primary stream of the second media data.

11. The media receiver according to claim 10, further comprising a media stream redundancy controller configured to store in a media stream buffer the primary and redundant data streams of first media data.

12. The media receiver according to claim 11, wherein the media stream redundancy controller is further configured to store the primary data stream of the first media data in the media stream buffer and replace lost data packets of the primary data stream of the first media data with corresponding data packets from the redundant data stream of the first media data.

13. The media receiver according to claim 11, wherein the media stream switcher is further configured to disconnect the first receiver channel from receiving the primary data stream of the first media data and the media stream alignment controller is further configured to control the disconnected first receiver channel to receive a redundant data stream of the second media data to provide redundancy for the second media data.

14. The media receiver according to claim 13, wherein the media stream redundancy controller is further configured to store the primary data stream of the second media data in the media stream buffer and replace lost data packets of the primary data stream of the second media data with corresponding data packets from the redundant data stream.

15. The media receiver according to claim 10, wherein the media stream alignment controller is further configured to align the respective received data streams of the first and second media data by determining that an address of the media stream buffer has reset and then controlling a network port of the second receiver channel to receive the respective data stream of the second media data.

16. The media receiver according to claim 11, wherein the media stream buffer is a single shared memory comprising separate memory banks for storing the respective received data streams of the first and second media streams, respectively.

17. The media receiver according to claim 11, further comprising a packet parser configured to parse data packets of the respective primary data streams of first and second media data to identify respective header information and the corresponding RTP time stamps.

18. The media receiver according to claim 10, wherein the media stream alignment controller is further configured to store the respective data stream of the second media data in the media stream buffer upon alignment of the respective data stream of the first media data based on the respective RTP time stamps of the data packets of the first and second media data.

19. A media receiver for performing lossless switching of media streams, the media receiver comprising:
    at least two receiver channels configured to receive redundant data streams of first media data, respectively;
    means for controlling playout of the first media data on an audio/video ("A/V") device;
    means for switching one of the at least two receiver channels from receiving one of the data streams of the first media data to receiving a data stream of second media data in order to initiate a switch from the first media data to the second media data without increasing a total amount of data streams received by the media receiver; and
    means for aligning the received data streams of the first and second media data by determining respective real-time transfer protocol ("RTP") time stamps parsed from data packets of the received data streams and phase locking the RTP time stamps of the respective data streams to a top of frame reference signal; and
    means for performing a lossless switch between the aligned respective primary data streams without discontinuity of playout by the A/V device during the switch from playout of the first media data to playout of the second media data.

* * * * *